(12) United States Patent
Okada et al.

(10) Patent No.: US 7,630,796 B2
(45) Date of Patent: Dec. 8, 2009

(54) BODY ACTION INFORMATION SYSTEM

(75) Inventors: Minoru Okada, Gifu (JP); Kazuyoshi Kato, Kariya (JP); Masashi Kato, Nagoya (JP); Toshiki Matsumoto, Kariya (JP); Mamoru Sawada, Yokkaichi (JP)

(73) Assignee: Denso Corporation, Kariya (JP)

( * ) Notice: Subject to any disclaimer, the term of this patent is extended or adjusted under 35 U.S.C. 154(b) by 474 days.

(21) Appl. No.: 11/274,766

(22) Filed: Nov. 15, 2005

(65) Prior Publication Data

US 2006/0061464 A1 Mar. 23, 2006

Related U.S. Application Data

(63) Continuation-in-part of application No. 11/214,643, filed on Aug. 30, 2005.

(30) Foreign Application Priority Data

| Sep. 6, 2004 | (JP) | ............................. | 2004-258335 |
| Nov. 19, 2004 | (JP) | ............................. | 2004-335491 |

(51) Int. Cl.
*G06F 7/00* (2006.01)
(52) U.S. Cl. ....................................................... 701/1
(58) Field of Classification Search ..................... 701/1, 701/41; 340/459, 500; 180/199, 6.2
See application file for complete search history.

(56) References Cited

U.S. PATENT DOCUMENTS

| 5,781,872 | A | | 7/1998 | Konishi et al. |
| 5,802,478 | A | | 9/1998 | Iwasaki |
| 5,969,969 | A | * | 10/1999 | Ejiri et al. ..................... 701/41 |
| 6,151,546 | A | | 11/2000 | Schmitt et al. |
| 6,577,928 | B2 | * | 6/2003 | Obradovich ................... 701/1 |
| 6,683,539 | B2 | | 1/2004 | Trajkovic et al. |
| 2002/0107106 | A1 | | 8/2002 | Kato et al. |
| 2004/0036601 | A1 | | 2/2004 | Obradovich |
| 2004/0142793 | A1 | | 7/2004 | Boll et al. |
| 2005/0049761 | A1 | | 3/2005 | Kataoka et al. |
| 2005/0182548 | A1 | | 8/2005 | Bernzen et al. |
| 2005/0200088 | A1 | | 9/2005 | Sawada et al. |
| 2005/0273209 | A1 | | 12/2005 | Bernzen et al. |
| 2007/0150158 | A1 | | 6/2007 | Inoue et al. |

FOREIGN PATENT DOCUMENTS

| DE | 4014561 | 11/1991 |
| DE | 197 34 112 A1 | 11/1999 |

(Continued)

OTHER PUBLICATIONS

Partial European Search Report dated Dec. 21, 2005.

(Continued)

*Primary Examiner*—Yonel Beaulieu
(74) *Attorney, Agent, or Firm*—Harness, Dickey & Pierce, PLC

(57) ABSTRACT

A system and method are disclosed for providing a display relating to at least one aspect of vehicle body action. The system includes at least one sensor, to sense information of a vehicle. Further, an estimating part is included to determine at least one aspect of vehicle body action based upon the sensed information. Finally, a display is located within the vehicle, to provide a visual display relating to at least one aspect of the determined vehicle body action.

31 Claims, 21 Drawing Sheets

FOREIGN PATENT DOCUMENTS

| | | |
|---|---|---|
| DE | 103 31 367 A1 | 7/2002 |
| EP | 0 795 429 A2 | 9/1997 |
| GB | 2 388 579 A | 11/2003 |
| JP | A-H8-21664 | 8/1996 |
| JP | A-H8-216642 | 8/1996 |
| JP | 10-264839 | 10/1998 |
| JP | 2001-168599 | 6/2001 |
| JP | 2001-231109 | 8/2001 |
| JP | 2003-015741 | 1/2003 |
| JP | 2004-168148 | 6/2004 |
| WO | WO 03/076228 A1 | 3/2003 |
| WO | WO 03/076243 A1 | 3/2003 |

OTHER PUBLICATIONS

Extended European Search Report dated Feb. 16, 2006.
United States Office Action dated Mar. 27, 2008.
Office Action (w/English Abstract) from Japan Patent Office dated Sep. 18, 2008 for corresponding Japanese Patent Application 2004-258336.
Takeuchi et al, Technical Papers: "Sensibility Analysis of Vibration Transfer Pass and Control of Input Force to Reduce Acceleration Shock" with English translation.
Office Action (w/English Translation) from Japan Patent Office dated Mar. 17, 2009 for corresponding Japanese Patent Application 2004-258335.

* cited by examiner

111: ACTION INFORMING DEVICE (HEAD UP DISPLAY)
110

130: THE PRESENT TIRE PIECE ANGLE
130: THE PRESENT TIRE PIECE ANGLE
131: THE TIRE TARGET PIECE ANGLE
131: THE TIRE TARGET PIECE ANGLE

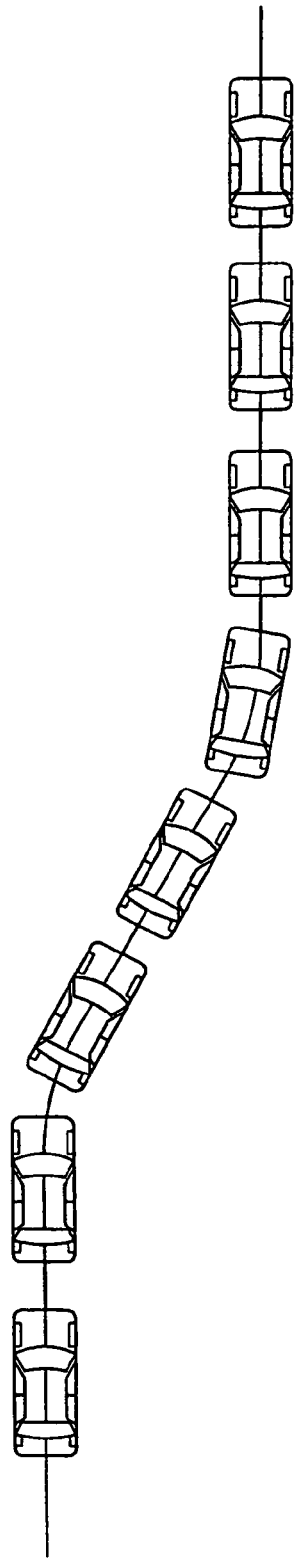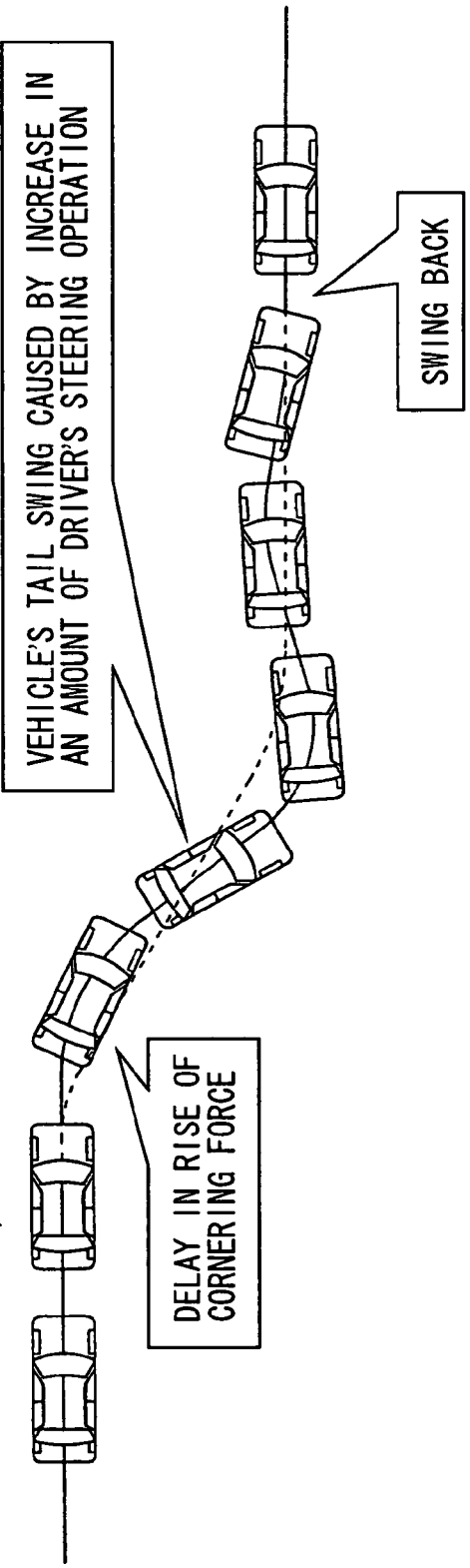
FIG. 22A
GOOD HANDLING AND STABILITY
(LARGE CORNERING POWER)
FIG. 22B
POOR HANDLING AND STABILITY
(SMALL CORNERING POWER)
DELAY IN RISE OF CORNERING FORCE
VEHICLE'S TAIL SWING CAUSED BY INCREASE IN AN AMOUNT OF DRIVER'S STEERING OPERATION
SWING BACK

ACCELERATING

DECELERATING

TURNING

BODY ACTION INFORMATION SYSTEM

CROSS REFERENCE TO RELATED APPLICATIONS

The present application hereby claims priority under 35 U.S.C. §119 on Japanese patent application number JP2004-335491 filed Nov. 19, 2004, the entire contents of which is hereby incorporated herein by reference. Further, the present application claims priority under 35 U.S.C. §120 and is a Continuation-in-Part of U.S. patent application Ser. No. 11/214,643 entitled VEHICLE STABILITY CONTROL SYSTEM, filed Aug. 30, 2005 (claiming priority on JP 2004-258335 filed Sep. 6, 2004), the entire contents of which is hereby incorporated herein by reference.

BACKGROUND OF THE INVENTION

Conventionally, there were various proposals for systems reporting a vehicle condition to a passenger in real time. For example, JP2001-231109A discloses a system reporting a condition of use of the various sources of power of a fuel-cell on vehicle to a passenger in real time. In JP7-103782A, the vehicles condition was determined based on the information of the various sensors of the vehicle, and was reported to the passenger using a numerical value or a meter (or indicator needle).

Ordinary drivers and passengers who are operating real vehicle have regarded sensuously vibration, skids, etc. for example dive, squat of a vehicle, pitching and rolling, as types of vehicle body actions or forces acting on the vehicle body. Forces acting on the vehicle body include but are not limited to the amount of vibration and/or the amount of oscillating change at the time of performing certain vehicle operations (input to the vehicle body with a certain movement characteristics).

In order to understand the vehicle body movement characteristics or actions, one must normally log sufficient driving experience with a vehicle. This is done to understand vehicle body action and reaction correctly. Inexperienced or beginner drivers cannot understand the movement characteristics of the vehicle body, e.g. what kind of vibration the vehicle body demonstrates depending on steering characteristics, what amount of oscillation changes with a given speed, how fast to turn a steering wheel and what results occur, how accelerator or brake pressure operates to act on the vehicle, etc.

Further, since the shape and the boarding position of a seat or chair of a vehicle differs from vehicle to vehicle, an individual driver, even a skillful driver, finds it difficult to understand and appreciate vehicle body action when changing to a different vehicle. If a driver could understand the vehicle body action in real time and instinctively, it would be useful for an understanding of the movement characteristics of the vehicle body. As a result, safer operation would be possible.

Further or alternatively, if a crew member or passenger who is not a driver, could understand vehicle body action in real time and instinctively, the passenger could advise the driver regarding vehicle operation. This may be helpful in the case where the driver cannot actually operate the vehicle.

As currently indicated by JP2001-231109A, the supplying power condition of the vehicle is supplied (fuel cell power condition), but there is no reporting regarding the action of the vehicle body. In JP7-103782A, although a vehicle condition is reported in real time, the information is only reported in a numeric fashion, based on a numerical value and meter form. Thus, a passenger cannot understand the action of the vehicle body intuitively.

SUMMARY OF THE INVENTION

At least one embodiment of the invention is aimed at improving upon or even solving at least one the above-mentioned problems. At least one embodiment is aimed at real time and intuitive reporting of actions or forces acting on the body of a vehicle to a human being in the car (passenger, driver, etc.).

BRIEF DESCRIPTION OF THE DRAWINGS

FIG. 22A is a graphical depiction of a vehicle trajectory obtained when a sufficient cornering force can be produced with a small slip angle.

FIG. 22B is a graphical depiction of a vehicle trajectory obtained when a sufficient cornering force cannot be produced without a large slip angle.

DETAILED DESCRIPTION OF THE PREFERRED EMBODIMENTS

Figure 1:
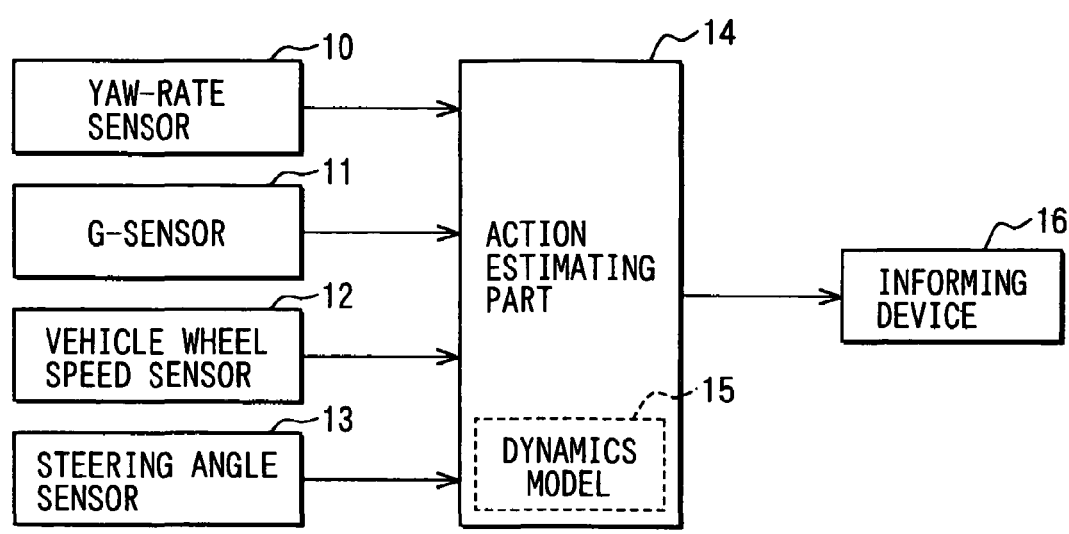
FIG. 1 is a block diagram showing the composition of a system for the vehicle used in an embodiment of the invention.

Hereafter, an embodiment of the invention is explained. FIG. 1 is a block diagram showing an example of a vehicle body action information system of an embodiment of the invention. The system may include input information gathering sensors. These sensors can include, but are not limited to, one or more of the following example sensors: a steering angle sensor 13, a yaw-rate sensor 10 which measures horizontal yaw-rate of a vehicle body center-of-gravity, a G (Gravity) sensor 11 which measures the acceleration of a direction of back and forth near the vehicle body center of gravity, and a vehicle wheel speed sensor 12 which measures speed of at least one of the wheels, etc.

The sensor outputs are inputted into an action estimating part 14. Such an action estimating part 14 may include a computer or processor, the computer or processor being either a newly added dedicated processor or including use of an existing processor (such as that for a vehicle navigation system for example). At least one aspect of present action of the vehicle body may then be determined or otherwise simulated in the action estimation part 14, including a dynamics modeling device 15 for dynamics modeling and simulation of the vehicle body based upon sensor input. An example of such a dynamics modeling device 15 is disclosed in Japanese Patent Application No. 2004 258335 filed Sep. 6, 2004, the entire contents of each of which is hereby incorporated herein by reference.

Determining or otherwise simulating of at least one aspect of the vehicle body action may be achieved based upon received sensor input, by computing for example vehicle roll, the pitch, the turning angle of the tires, and/or yaw in the center of gravity of the vehicle body. The at least one aspect of determined or otherwise simulated vehicle body action is then converted into a modified visual simulation of the vehicle using the dynamics modeling device 15, and is then reported to a driver and/or passenger via the informing device 16 in a picture display format. The display simulation thus may represent at least one aspect of the determined vehicle body action. Further, the visual display may be a simulation of a plurality of different views of the vehicle, and/or the display simulation may also represent a plurality of aspects of the determined vehicle body action.

Thus, a system and method are disclosed for providing a display relating to at least one aspect of vehicle body action. The system may include at least one sensor, to sense information of a vehicle. Further, an estimating part is included to determine at least one aspect of vehicle body action based upon the sensed information. Finally, a display is located within the vehicle, to provide a visual display relating to at least one aspect of the determined vehicle body action.

Figure 2:
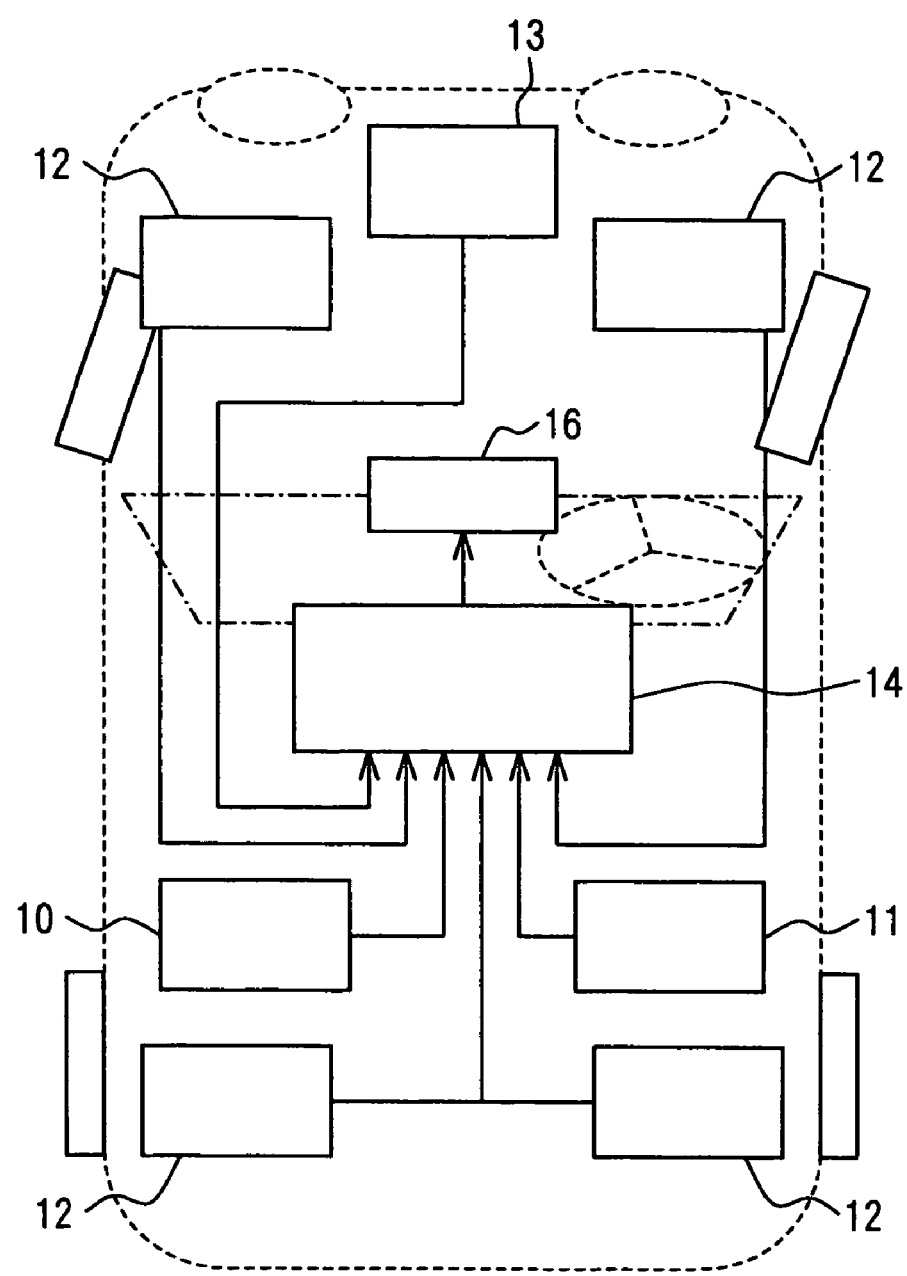
FIG. 2 is a block diagram showing an example arrangement on a vehicle, of the various sensors and other components of the system used in the first embodiment.

One example embodiment of this invention is explained in detail from FIG. 2 to FIG. 5. FIG. 2 illustrates an example arrangement of sensors and the action estimating part 14 in a vehicle body. A vehicle wheel speed sensor 12 may be arranged on at least one wheel axis and may be, for example, arranged on each wheel axis. A yaw-rate sensor 10 and a G sensor 11 may be arranged on or near the vehicle center of gravity. The steering angle sensor 13 may be arranged to be connected or otherwise attached to a steering shaft of the vehicle. The sensed vehicle condition information thus may include, for example, at least one of steering angle of at least one of the wheels of the vehicle, yaw rate of the vehicle, and wheel speed of at least one of the wheels of the vehicle.

Outputs of the yaw-rate sensor 10, the G sensor 11, the vehicle wheel speed sensor 12 and the steering angle sensor 13 may then be inputted into an action estimating part 14, which may be arranged on the floor or bottom portion of the vehicle for example. The action estimating part 14 may be provided with an operation processing function as indicated above (processor) and memory function (memory), not shown. The memory may be adapted to store a dynamics modeling device 15 of the vehicle, to aid in dynamics modeling of the particular vehicle being used (and to thereby subsequently create a display of the vehicle body action). In at least one embodiment, the display simulation may be that of the particular make and/or model of the vehicle being used, to aid the driver/passenger in the feeling of real time information feedback.

The dynamics modeling device 15 creates a visual simulation of at least one aspect of the vehicle body movements, at least in the case of input by driver, for example steering, accelerating and braking; and in the case of input from external disturbances, for example road surface vibration (based upon vehicle sensor input). In other words, the dynamics modeling device 15 expresses vehicle body action mathematically and provides outputs reflecting at least one aspect of the vehicle body action in a visual manner using vector notation and vehicle simulation. The action estimating part 14 is for carrying out operation processing of output values of this dynamics modeling device 15, and any sensor outputs (creating visual vehicle simulation for display).

The action estimating part 14 determines one or more aspects of actions of the vehicle body and outputs a vehicle simulation illustrative thereof, to an informing or output device 16. The informing device 16 may include a type of display screen, for example, and displays the determined present vehicle action in a picture format. Further, the display screen may be a separate device or may be part of an already existing display (such as on an existing vehicle display for navigation and/or television display, for example). The informing device 16 may be for displaying a visual simulation of the vehicle, adjusted based upon at least one determined vehicle body action.

Figure 3:
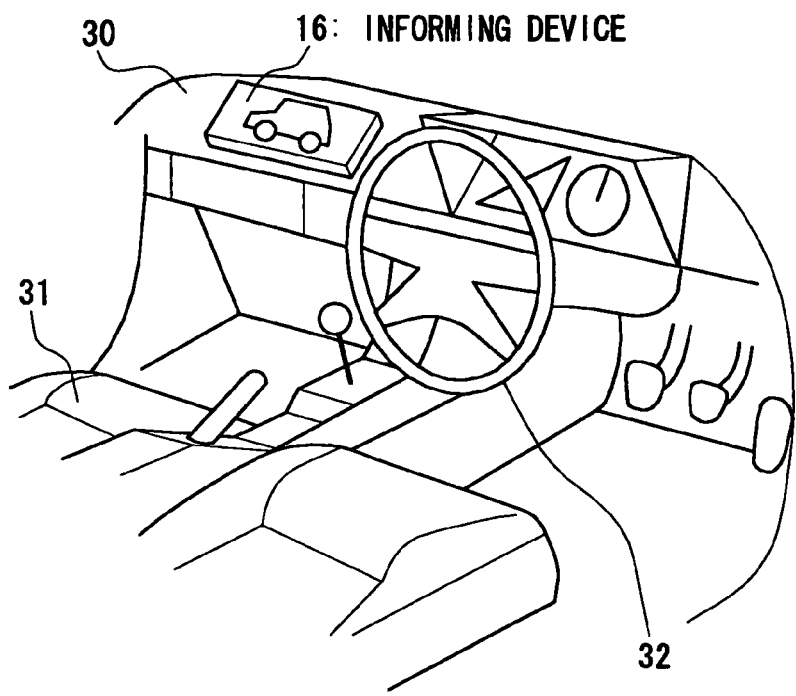
FIG. 3 is a schematic diagram of an informing device of at least embodiment, in a vehicle front panel.

FIG. 3 is an example arrangement of the informing device 16, and illustrates a picture simulation which shows the action of vehicle displayed by the informing device 16. Such an informing device 16 may be installed in a front panel 30 of the vehicle. For example, as illustrated in FIG. 3, it may be installed in a front panel 30 by the side of the passenger seat 31, away from the steering wheel 32.

By such arrangement as shown by the informing device 16 of FIG. 3, the normal checking operation of a speedometer or a tachometer by the driver, need not be disturbed. However, when needed, a driver (or passenger) can check the vehicle body action on the additional display screen. Moreover, by understanding the actions of the vehicle body in real time, advice about operation of the vehicle may be given by the passenger. As such, the driver's understanding of vehicle body action can be improved.

Figure 4:
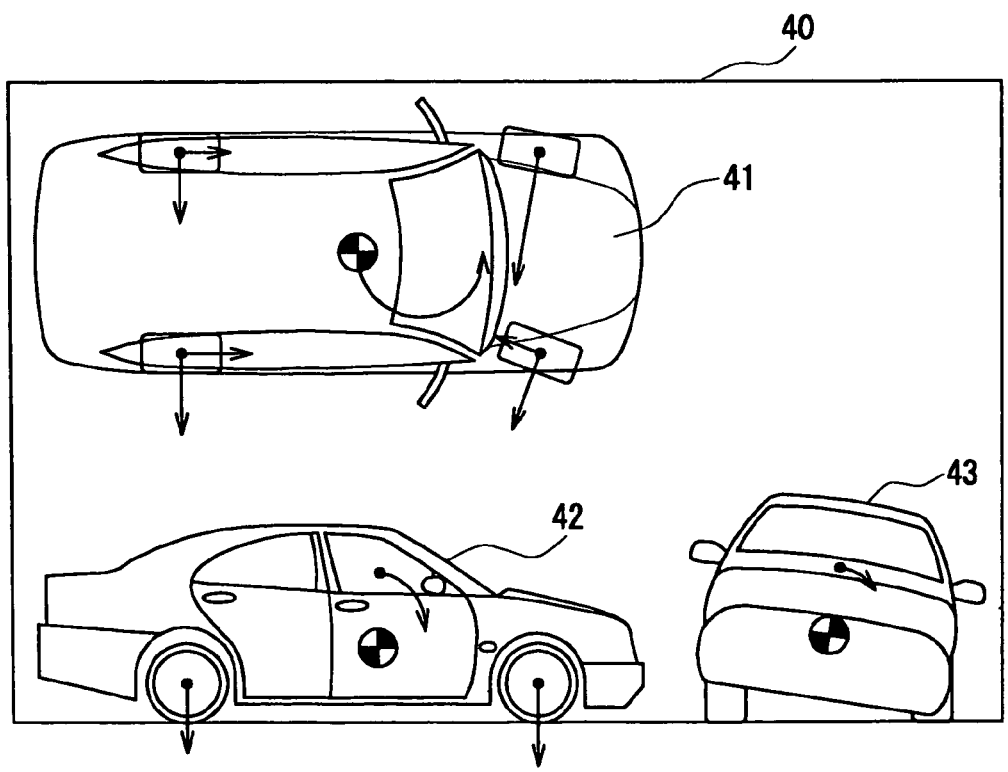
FIG. 4 is a picture group illustrating a simulation of vehicle action with respect to different perspectives of the vehicle body displayed by the informing device.

FIG. 4 is an example of a picture group 40 illustrating a display on the informing device 16, and is a reproduction of real-time vehicle body action using illustration or vehicle simulation. Again, the vehicle views are of an example, non-limiting representation, as other and/or alternative views (or less or more views) may be provided. In the picture group 40, the upper left picture 41 (henceforth, the top view picture 41) illustrates the whole body when viewed from above the vehicle. The lower left picture 42 (henceforth, the side view picture 42) illustrates the whole body viewed from one side. And the lower right picture 43 (henceforth, the rear view picture 43) illustrates the whole body when viewed from behind the vehicle.

A passenger or driver (any person) viewing the informing device 16 can thus, from the example of FIG. 4, understand yaw and/or tire angle when viewing the top view picture 41 for example. A person can further understand pitching moments, for example, when viewing the side view picture 42. Further, a person can also understand the action of vehicle roll when viewing the rear view picture 43 for example. As such, useful information can be conveyed in real time to people within the vehicle.

By reporting a combination of the top view picture 41 and the side view picture 42, as shown in FIG. 4 for example, a passenger or driver (person) viewing the informing device 16 can understand easily the action of the whole vehicle body when the driver carries out vehicle acceleration or slowdown combined with a steering operation. The person tends to easily understand the relation of vehicle roll and pitch from the side view picture 42 and the back picture 43, arranged in a transverse direction. Thus, the result of vehicle action is reflected in real time by this picture group 40.

The length of an arrow on the informing device 16 may represent the size or amount of a displayed parameter such as pitch, roll, yaw, and/or cornering force for example. Thus, a person viewing the informing device 16 can receive this vehicle action information so that he can easily understand both the forces acting on the vehicle and the strength of these forces.

Figure 5:
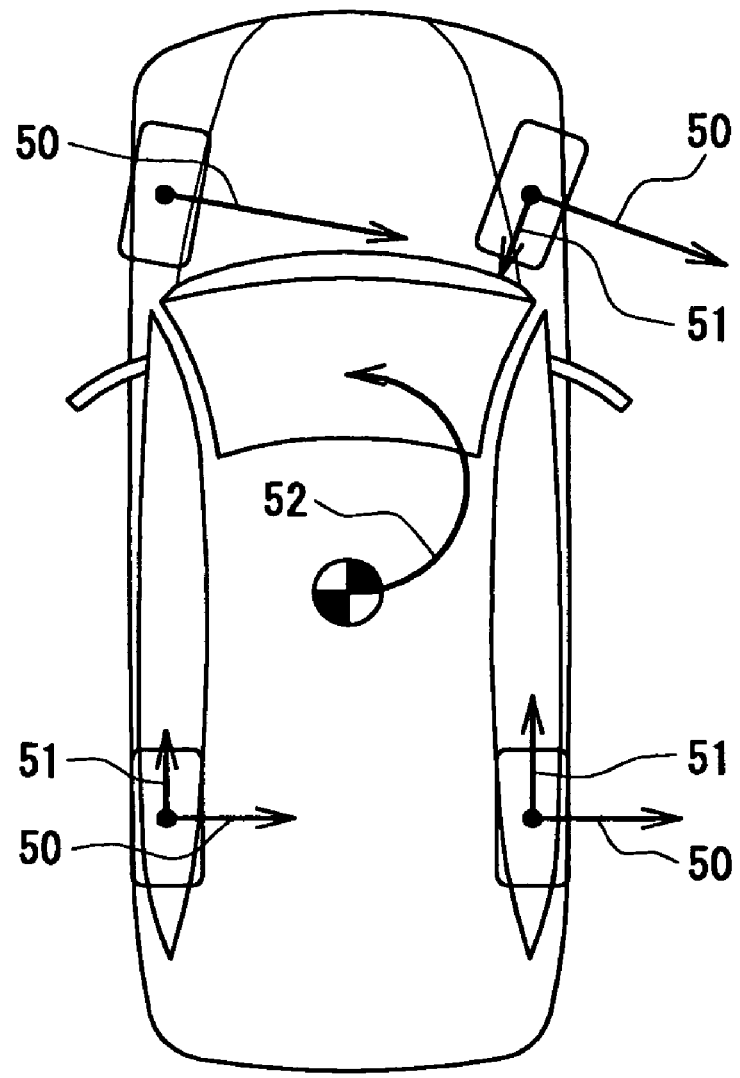
FIG. 5 is an enhanced illustration of one of the vehicle views of FIG. 4, illustrating arrows representing vector information representing vehicle body movement, adjusted in length and angle in proportion to the parameter being displayed.

Further, by using vector information, for example as shown in FIG. 5, both angle and scalar information can be conveyed. FIG. 5 is the example illustrating display of amount (or scalar information) and angle of yaw 52, tire lateral force 50, and tire longitude force 51, displayed via vector information, when viewed from above the vehicle. For example, the steering wheel angle information may be conveyed in the information picture group 40 via tire angle displayed on the informing device 16, so that a person can easily understand the present tire angle.

Thus, an embodiment of the inventive system relates vehicle action to a viewer using the dynamics modeling device 15 of the vehicle. Thus, it is possible for real time and intuitive reporting of the action of the present state of the whole vehicle body to a person in the vehicle. Thereby, a person in the vehicle can easily understand the action of vehicle, and therefore aid in providing a safe driving operation.

Figure 6:
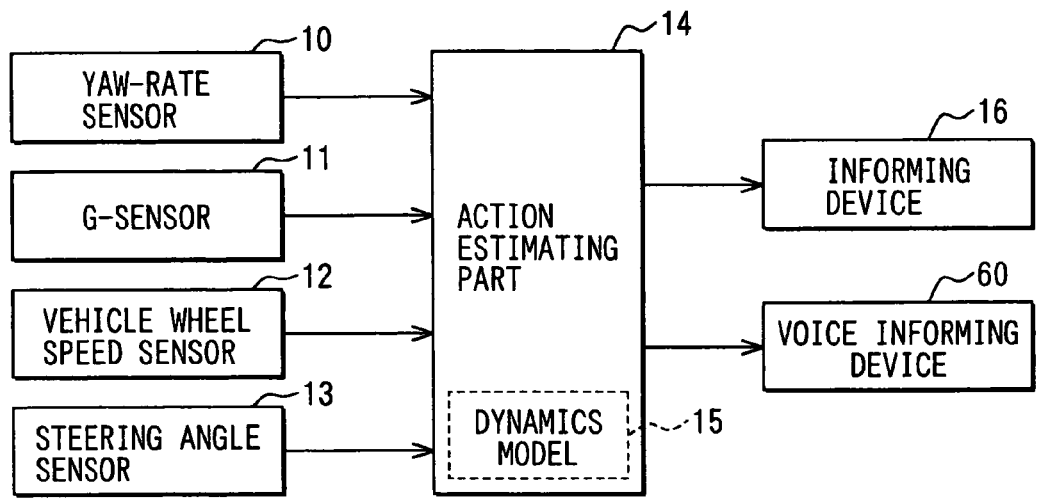
FIG. 6 is a block diagram illustrating an embodiment including an audible informing device.

Another embodiment of the invention is illustrated in FIG. 6. Explanations of the same parts used in at least one previous embodiment have been omitted or simplified for ease of understanding and for the sake of brevity. One difference between this embodiment and at least one previous embodiment is that a voice informing device 60 is included. The audible informing device 60 may be used, for example, for audibly projecting vehicle action information to a person inside the vehicle via audible sound, in addition to display of picture information. As one non-limiting example, if it is determined that the vehicle will be in a skidding condition, an alarm sound may be reported to a person inside the vehicle via the audible informing device 60. Via such an audible system, a driver can understand the action of the whole vehicle body, in addition to and/or without the need to visually view an information picture. Further, other passengers can understand the action of the whole vehicle body in real time via both picture display and audible sounds. Thus, the audible informing device 60 may audibly convey information relating to at least one aspect of the determined vehicle body action to the person in the vehicle.

Figure 7:
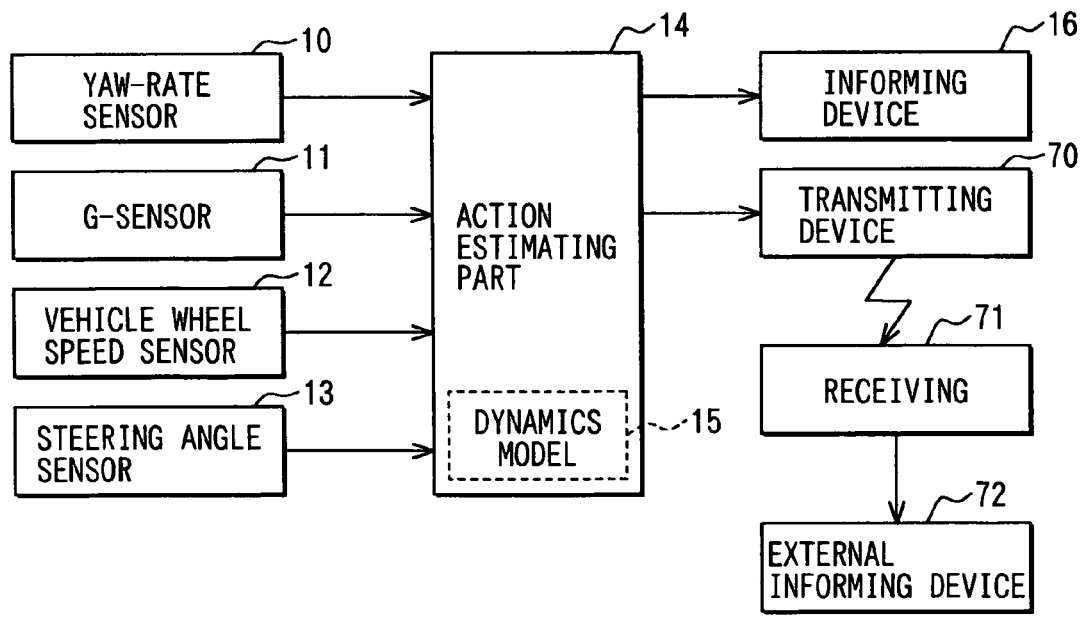
FIG. 7 is a block diagram illustrating an embodiment including an external informing device, transmitting device and receiving device.

FIG. 7 shows another embodiment. Again, explanations of the same parts used in at least one previous embodiment have been omitted or simplified for ease of understanding and for the sake of brevity. As shown in FIG. 7, differences between this embodiment and at least one other above-mentioned embodiment include a transmitting device 70 which transmits the action of the whole body to the vehicles exterior, a receiving device 71 which receives the vehicle action information; and/or an external informing device 72 which can report received action information to an area external to the vehicle, for example to human beings and/or computer devices external to the vehicle. Thus, the transmitting device 70 may transmit at least one aspect of the determined vehicle body action information out of the vehicle, wherein the transmitted information is received (via a receiving device 71 for example) and utilized outside of the vehicle (for example by human beings and/or computer devices external to the vehicle).

The transmitting device 70 may be installed on an internal portion of the vehicle, and the receiving device 71 and the external informing device 72 may be external to the vehicle. Thereby, actions or forces acting on the whole vehicle body can be reported not only to passengers and people within the vehicle, but also to people and/or computer devices outside of the vehicle. Therefore, when necessary, people and other devices outside the vehicle can easily understand the reported body action of the vehicle. One non-limiting example is as follows.

One non-limiting example of the use of the overall system shown in FIG. 7 may be in the race car or vehicle testing arena. For example, in either auto racing or vehicle testing, a receiving device 71 may be located along a racing or test track, and an external informing device be connected thereto (in any known manner via a wireless and/or wired connection) and may include a type of computer simulation/display device for viewing by others (crew members for example) not within the vehicle. Thus, information regarding vehicle body actions can be displayed and/or used for diagnostic purposes in an area external to the vehicle.

Figure 8:
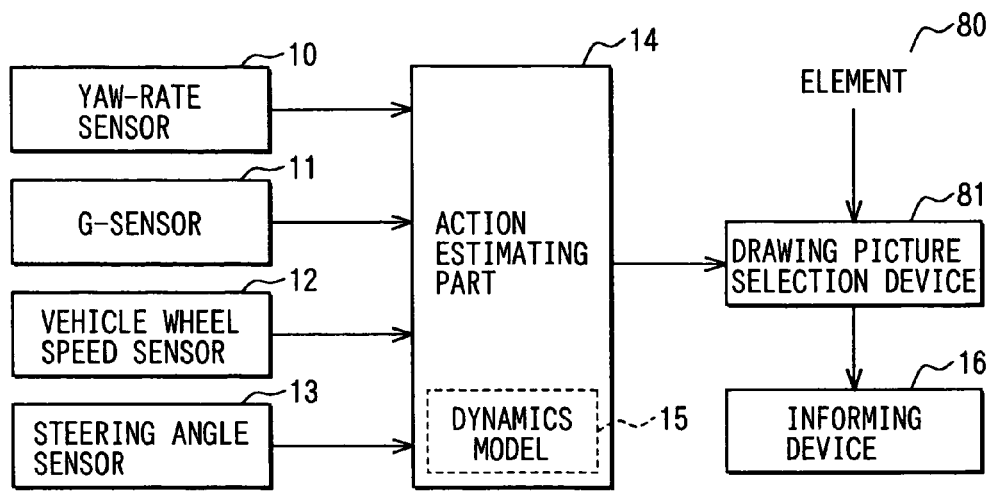
FIG. 8 is a block diagram illustrating an embodiment including a manual switch and drawing picture selection device.
Figure 9:
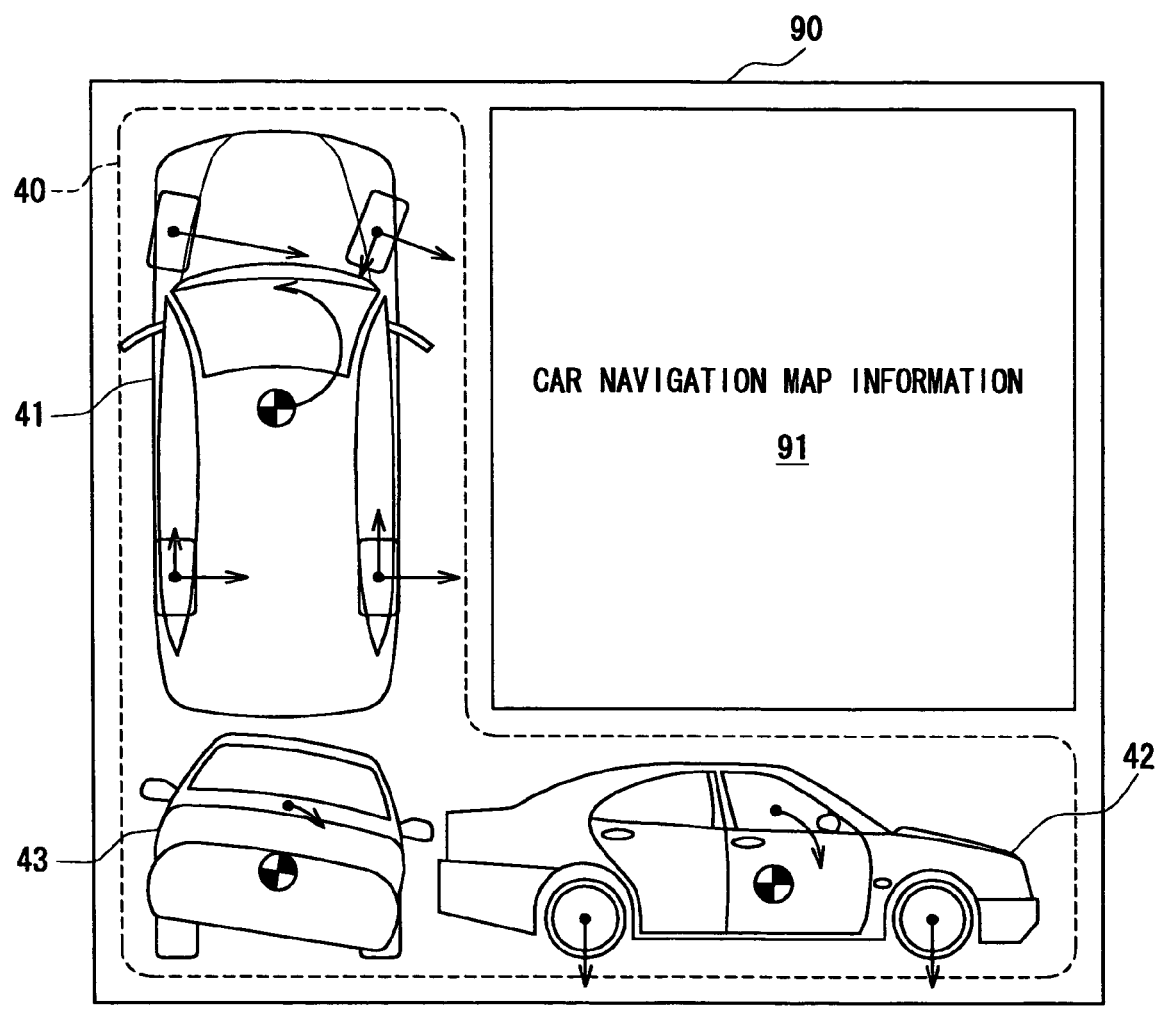
FIG. 9 illustrates an embodiment including a monitoring screen which displays both car navigation information and vehicle body action.

Another example embodiment is explained based on FIG. 8 and FIG. 9 of the application. Again, explanations of the same parts used in at least one previous embodiment have been omitted or simplified for ease of understanding and for the sake of brevity. This embodiment differs from at least one other embodiment in the display arrangement for the picture group 40 and the reporting or displaying of this arrangement of the picture group 40.

FIG. 8 is an input-and-output block diagram of this embodiment. This example embodiment includes a drawing picture selection device 81. In this embodiment, the action estimating part 14 cooperates with an existing display of a navigation system (and processor for example), to provide another display arrangement as compared with at least one previous embodiment. A passenger or driver can thus be provided with the ability, via the drawing picture selection device 81, to display the picture group 40 along with the navigation display. As such, existing buttons of the navigation display can be used as a type of manual switch 80 to vary between display of navigation only, navigation plus picture group 40, picture group 40 alone, etc.

Alternatively, or in addition thereto, the drawing picture selection device 81 may be used (in conjunction with a manual switch 80, being a switch of the navigation, a touch panel switch of the display, etc.) to vary picture display and/or position arrangement of the information freely, by choosing the kind and position of the displayed picture illustrations using the drawing picture selection device 81 (via a manual selection operation as illustrated by element 80 for example). That is, a person in the vehicle may select the display position of a picture and the kinds/views of a pictures to be displayed (for example several or one different view(s) of a 2-dimensional picture of the vehicle or a 3-dimensional picture being compilation of the vehicle body from the upper view, the side view, the front view, the back view, etc).

Thus, the drawing picture selection device 81 may be used for selecting at least one of a number of vehicle views provided by said informing device 16, a picture display location, a 2-dimensional picture display form, and a 3-dimensional picture display form, wherein the informing device 16 is further for providing a visual display relating to at least one aspect of the determined vehicle body action to be provided based on at least one selection of the drawing picture selection device 81.

FIG. 9 is one non-limiting example of a varied arrangement of the display format shown in FIG. 4, and is one example of providing the information picture on a vehicle display monitor 90 (for example, on a vehicle navigation system display monitor 90) for vehicle navigation. The action estimating part 14 which determines vehicle action, may be installed in conjunction with the vehicle navigation system, for example (utilizing the same processor and/or memory, for example, as the processor of a navigation system is not typically used extensively), and thus can utilize the same display monitor 90. As for one example arrangement of the picture group 40 as shown in FIG. 9, the top view picture 41 is displayed in a lengthwise direction on the top left of the display monitor 90, the rear view picture 43 is displayed under the top view picture 41 on the bottom left of the display monitor 90, and the side view picture 42 is displayed on the bottom right of the display monitor 90. Map information 91 may thus be arranged at the upper right of the display monitor 90.

In this example display format, the top view picture 41 coincides with the movement of a real vehicle and is displayed at the top. Further, the rear view picture 43 is located at the bottom, beneath the top view picture 41. Finally, the side view picture 42 is displayed sideways or lengthwise as one would normally view a vehicle. As such, a person views the picture group 40 in a familiar and comfortable fashion. Of course, the present application should not be considered to be limited to the format of FIG. 9, and other display formats can be chosen and the display can be varied in many ways to change location of a view, eliminate or add a view, and/or to include or not include navigation or other information, etc.

One advantage has been discussed above regarding the display of the information picture group 40 in conjunction with a vehicle navigation system and display monitor 90. Although many vehicles of recent years include vehicle navigation systems, even if operating them in only a normal way, there are few users who actively use the vehicle navigation function. Further, in the case that path or vehicle route planning is performed, the processor in a vehicle navigation system needs to perform high level load operations. But once it sets up a course, unless it deviates from a scheduled course, the load on the processor is low and many resources remain. Accordingly, in the present embodiment, the information picture group 40 may easily be outputted to the vehicle navigation display monitor 90 using the existing processor and/or memory. As such, it can be an effective use of existing resources to use the processor of an existing vehicle navigation system for vehicle action determination.

Figure 10:
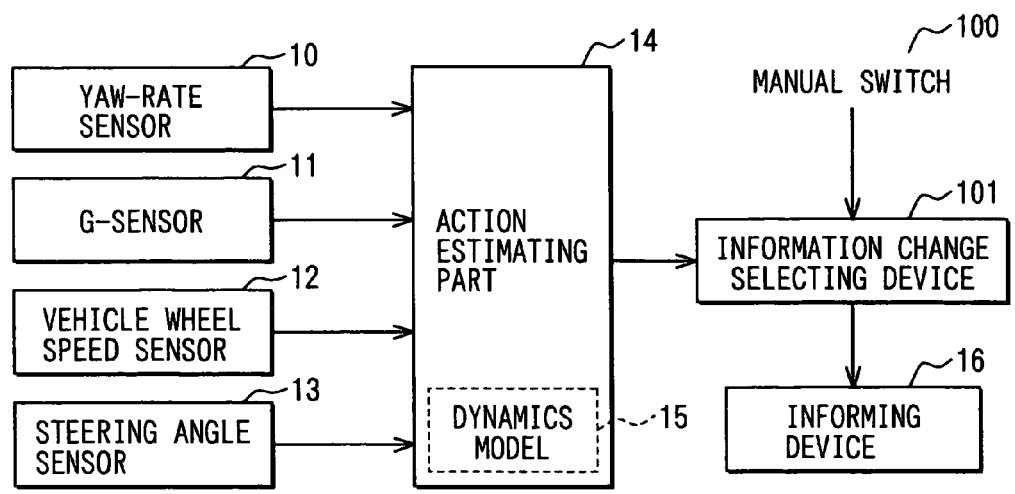
FIG. 10 is a block diagram illustrating an embodiment including a manual change operation input and information change selecting device.

FIG. 10 discloses yet another example embodiment of the present application. FIG. 10 illustrates an outline block diagram. Again, explanations of the same parts used in at least one previous embodiment have been omitted or simplified for ease of understanding and for the sake of brevity. This embodiment differs from at least one other embodiment in that a passenger or driver can, through a manual switch 100 similar to that explained above for example, change execution/stoppage of the display of information regarding vehicle action using the information change selecting device 101. When a passenger or driver feels that it is unnecessary that he be informed about changing vehicle actions or forces acting on the vehicle body, or merely wants to change the display, the display of information can be stopped and other or no information can be displayed.

Figure 11:
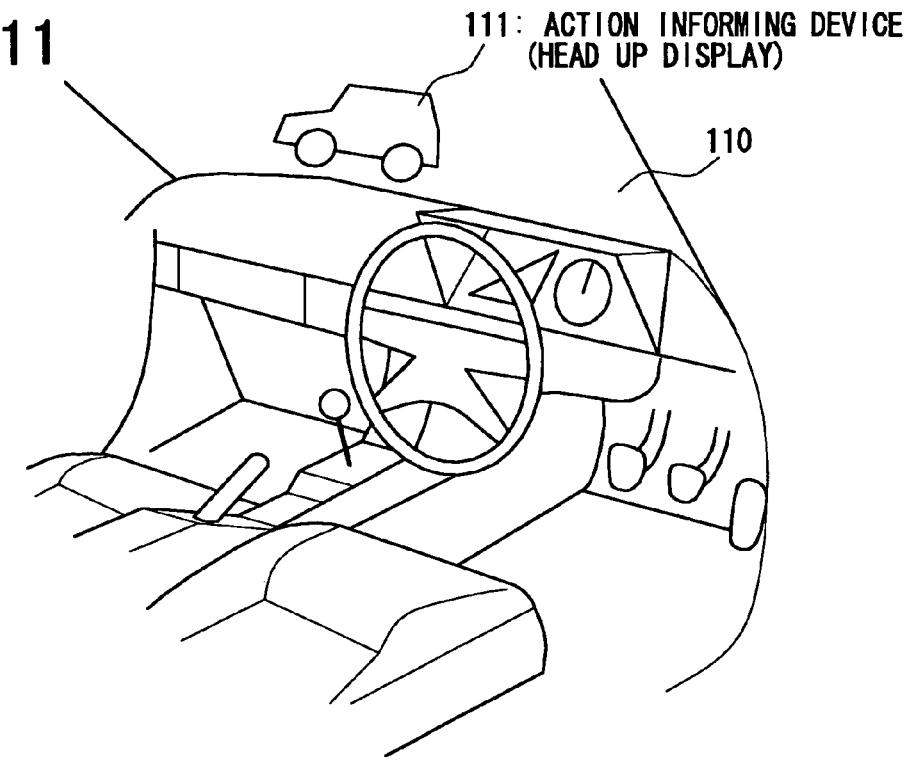
FIG. 11 is a schematic diagram illustrating an embodiment including a heads-up display.

FIG. 11 discloses still another example embodiment of the present application. Again, explanations of the same parts used in at least one previous embodiment have been omitted or simplified for ease of understanding and for the sake of brevity. This embodiment differs from at least one other embodiment in that the position of the display of the picture group 40 is changed. In this non-limiting example embodiment as shown in FIG. 11, the picture group 40 may be displayed using a heads up display 111, projected onto a windshield 110 for example (wherein the action informing device becomes the heads up display on the windshield, for example). Thereby, a driver can more easily understand the actions or forces acting of the whole vehicle body, without needing to move his head to take a look.

Of course, the position, size, etc. of the display on the windshield as shown, is only one non-limiting example of this embodiment of the present application.

Figure 12:
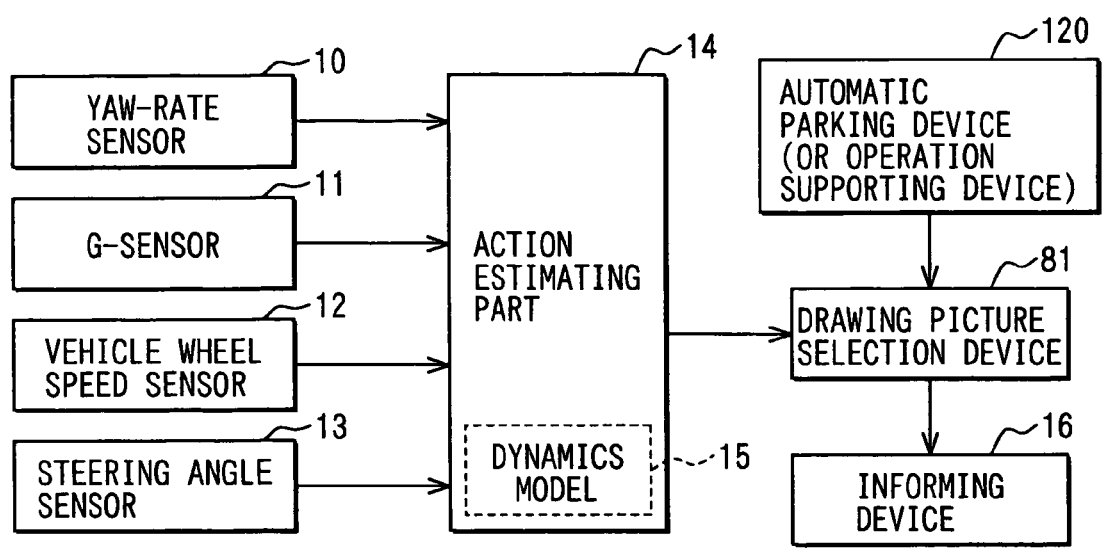
FIG. 12 is a block diagram illustrating an embodiment including an automatic parking device.

FIG. 12 discloses an even further example embodiment of the present application. Again, explanations of the same parts used in at least one previous embodiment have been omitted or simplified for ease of understanding and for the sake of brevity. This embodiment differs from at least one other embodiment in that an automatic parking device 120 is included. Such an automatic parking device 120 is generally known, although not in conjunction with any type of informing device 16.

An example of such a known parking device can be found in JPH10-264839A, the entire contents of which are incorporated herein by reference. Typically, using such an automatic parking device 120, a picture form a motion picture camera on the back of the vehicle is displayed. Thus, at best, an external picture of the vehicle surroundings is displayed.

As shown in FIG. 12, the automatic parking device 120 may connect with the drawing picture selection device 81 and/or informing device 16. The passenger can select to display a picture of the operation of the automatic parking device 120 to the interior of the vehicle in a novel manner. Further, the information obtained can also be used to display, apart from or in conjunction with the external pictures, vehicle body action simulation information or simulated vehicle body movement. Thus, an automatic parking device 120 is disclosed for aiding in parking a vehicle by aiding steering of the vehicle to at least one of a designated parking area and an area selected by a user, wherein the informing device 16 is further for providing the visual display via a picture.

Further, it should be understood that instead of an automatic parking device, an automatic driving device or a parking support device may be used in a similar manner to that discussed above. An example of such a known automatic driving device can be found in JP2003-015741A, the entire contents of which are incorporated herein by reference.

Although automatic parking was mentioned as the example in this embodiment, this system is effective when operating not only an automatic parking operation, but also a manual parking operation.

Figure 13:
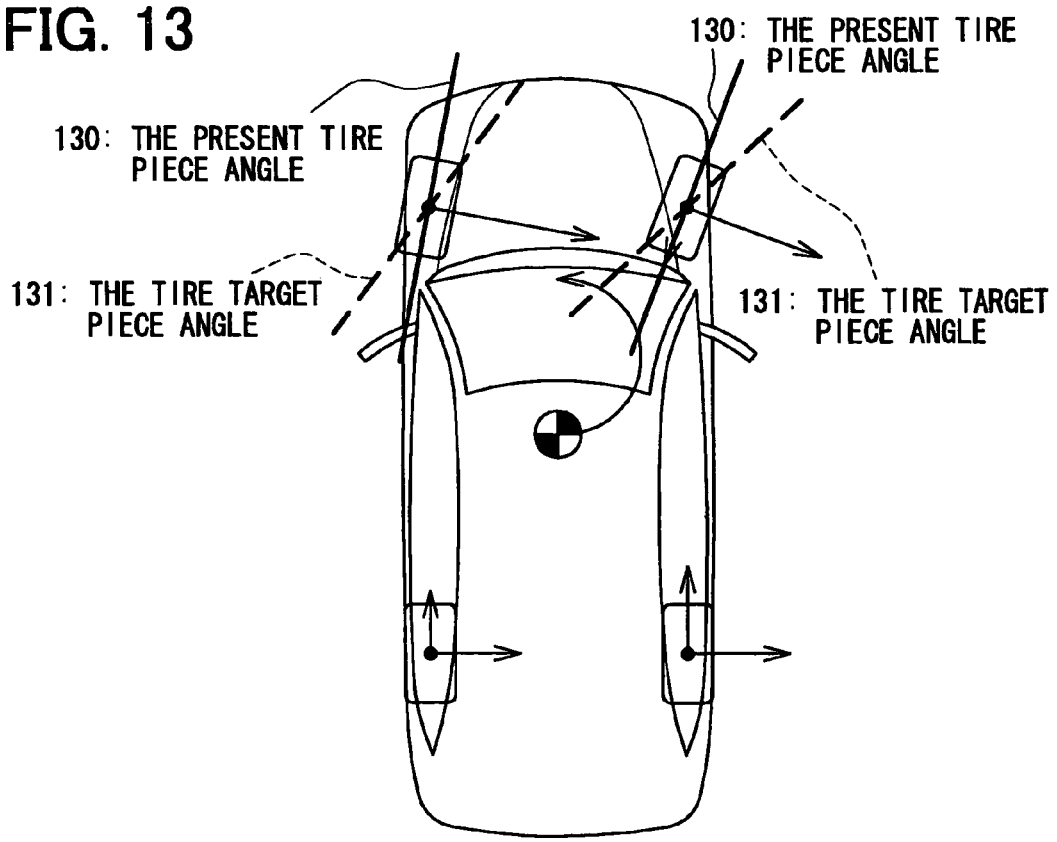
FIG. 13 is an example of another embodiment, displaying a target angle of a tire and a present tire angle.

FIG. 13 explains the above mentioned embodiment in illustrative form. The difference in this embodiment is the inclusion of an operation supporting device (not shown, but can replace automatic parking device 120 in FIG. 12 for example). This operation supporting device may be the device that performs steering and calculates directions of acceleration and deceleration, upon a driver performing actual operations in consideration of those directions. An example of such a known parking support, or operating supporting device can be found in U.S. Pat. No. 6,683,539, the entire contents of which are incorporated herein by reference.

Thus, an operation supporting device can be for supporting an operation for aiding steering to a parking area, the informing device 16 further being for providing a target and real time tire angle via a picture display when said operation supporting device is operating. FIG. 13 is an example of the information picture that can be displayed to the driver/passenger in any ways discussed in any of the previous embodiments.

For example, the operation of the operation supporting device (not shown, but can replace automatic parking device 120 in FIG. 12 for example) may include display of tire angle of at least one of the tires and/or a target steering angle for parking as operated by the automatic parking device 120. The display of both present tire angle and target tire angle is shown for the two front tires in FIG. 13 for example. If a picture can display and thus report the present tire angle at which the operation supporting device is operating, a driver/passenger can intuitively understand the current or present tire angle in relation to the target angle needed for parking. Thus, a manual steering operation can be done by the driver to achieve a smooth parking operation. Further, it is useful information for the driver when the driver is operating the steering wheel, in order to stop, slow, accelerate, increase, decrease, etc. the steering to achieve a desired parking position.

The target tire angle can be obtained based upon a known parking angle stored for the vehicle, and/or a known angle combined with obtained information. This obtained information can include, but is not limited to, the size of a parking space, for example, obtained from an image sensor or CCD camera for example. Thereafter, this tire target angle information can then be used in conjunction with sensed information for the present tire angle (detected based upon steering and speed information for example), to create a real time simulated display in conjunction with the dynamics modeling device 15, the action estimating part 14 and the informing device 16.

The present tire angle 130 may be shown in the top view picture 41, for example. Further, in the case of the operation supporting system operating, the target tire angle 131 may be displayed different from the present tire position (a different color, different style, etc.). In this embodiment shown in FIG. 13, the thick line is used for the present tire angle and the dashed line is used to represent desired or target tire angle. As such, a passenger or driver can more easily determine which represents the present tire angle 130 more easily. However, since the top view picture 41 may be updated by real time, even if the thick line and dashed lines are not used, tire shape itself can easily convey the present tire angle.

By combining an operation support device and at least one other embodiment, a passenger or driver can easily operate the steering wheel so as to match the present tire angle 130 with, and overlap the target tire angle 131. Thus, intuitive operation support is provided to the driver.

Accordingly, a system and method are disclosed for aiding in parking of a vehicle. Such a system includes at least one vehicle wheel sensor, to sense information of at least one wheel of a vehicle and an estimating device to determine action of at least one wheel of the vehicle based upon the sensed information. Finally, a display is included, within the vehicle, to provide a display of at least one target tire angle and at least one tire angle based upon the determined action, to thereby aid in parking of the vehicle. Further, a method may be provided for aiding in parking of a vehicle, the method including sensing information of at least one wheel of a vehicle; determining action of at least one wheel of the vehicle based upon the sensed information; and providing a display, within the vehicle, of at least one target tire angle and at least one tire angle based upon the determined action, to thereby aid in parking of the vehicle. In such a system (or method), information of at least two wheels of the vehicle may be sensed, determined, and displayed with corresponding target tire angles, to thereby aid in parking of the vehicle.

The dynamics modeling device 15 used at the time of action determination of vehicles may be varied up automatically or manually based upon a number of factors including but not limited to the number of passengers, the load of fuel, tire rub, etc.

The number of the sensors used for input at the time of determining the action of the whole vehicle body is acceptable if the system can perform action determination of the vehicle body. Any number of sensors may be used and thus the embodiments of the present application are not limited by the examples disclosed herein. Further, other examples of sensors can include but are not limited to an in-vehicle camera, a car navigation system, communication information between load and vehicle, etc.

The type of picture display to report information can be set differently from that disclosed and can be set automatically. Non-limiting examples may include a two-dimensional picture display via a wire frame, 3-dimensional picture display via a polygon, etc. Further variation can take place with regard to location of the display, size, and/or form of the display.

Processing of vehicle body action determination based upon sensor input may include use of an exclusive or dedicated processor, and/or may including sharing an existing processor including, for example, the processor of a vehicle navigation system, etc.

Moreover, another embodiment will be explained below.

The dynamics modeling device 15 explained in the above embodiments includes an on-spring body vibration model as one example of dynamics models. Furthermore, this on-spring body vibration model is used for a vehicle stability control system. Here, the on-spring body model and related equations will be described. Moreover, the vehicle stability control system will be also described using examples.

When a vehicle is turned, the total sum of cornering forces, which are forces produced at the tires, balances a centrifugal force acting on the vehicle. The relationship between slip angles and cornering forces depends on a vehicle speed and a tire performance, where the slip angle is defined as the angle between the direction a vehicle is traveling and the direction the tire is pointed. An exemplary relationship between the slip angles and cornering forces for each of standard and high performance tires is shown in FIG. 21.

Figure 21:
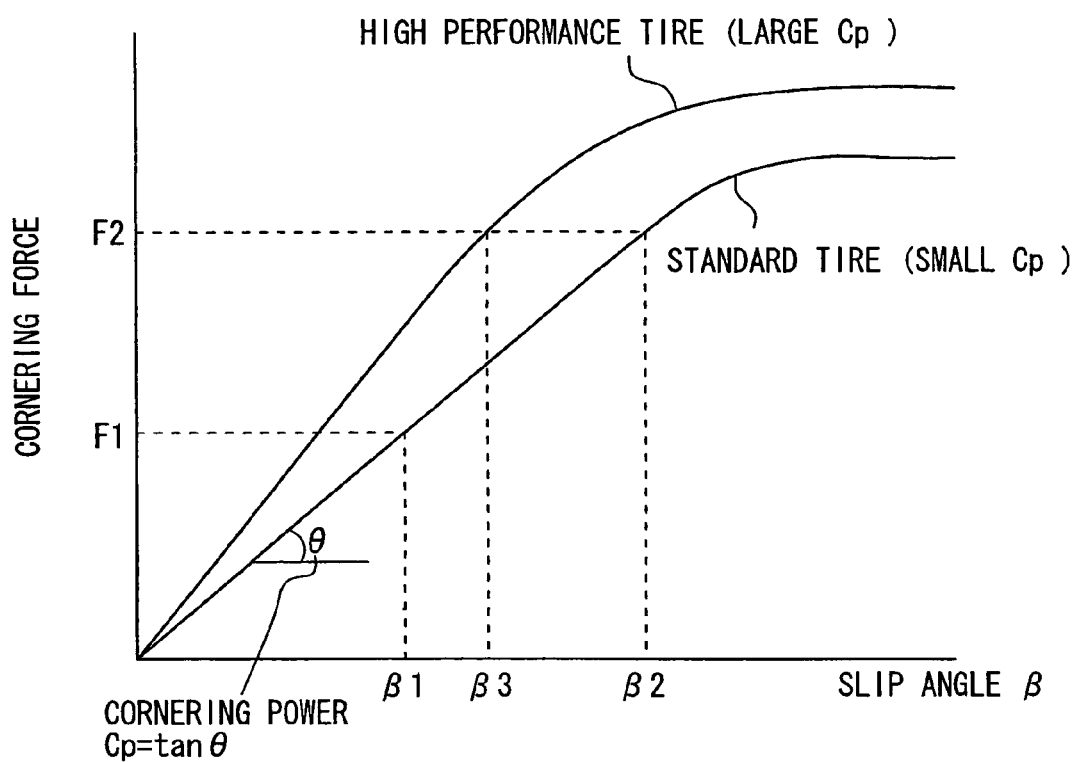
FIG. 21 is a graph illustrating a relationship between slip angles and cornering forces for each of a standard and a high performance tire.

As shown in FIG. 21, the cornering forces linearly increase with the slip angles β when the slip angles β are less than or equal to a certain value. Therefore, the higher the slip angle β, the higher the cornering force. The high performance tire can obtain higher cornering forces than the standard tire under the same slip angle β.

Accordingly, as a vehicle increases speed, the vehicle's tail is pointed outside and the slip angles β of the rear wheels must be increased to ensure the cornering force against the centrifugal force. This operation, however, depends on a tire's performance etc., and since higher cornering force is obtained with higher performance tires, the vehicle can be turned stably with less tail swing.

In other words, as cornering power, which is defined as the slope of cornering forces with respect to slip angles β, becomes larger, higher cornering power can be obtained even with a small slip angle β, thereby obtaining good handling and stability. In contrast, as the cornering power becomes smaller, larger slip angle β is necessary to obtain a large cornering force, resulting in poor handling and stability.

For example, as shown in FIG. 22A if a sufficient cornering force can be produced even with a small slip angle β, a vehicle easily follows a target trajectory and can maintain its stable posture without a large amount of driver's steering operation. In contrast, as shown in FIG. 22B, if a sufficient cornering force cannot be obtained without a large slip angle β, when a vehicle is turned, a delay may occur in the rise of cornering force. To cope with this situation, if the driver increases an amount of steering operation, a vehicle's tail swing may occur. Furthermore, a swingback may also occur when the vehicle returns to the target trajectory.

Accordingly, the cornering power of the tire is an important factor to determine a vehicle dynamic performance. Such a description is provided in Japanese Patent Laid-Open Publication No. 2001-168599.

The cornering power of the tire varies with, for example, contact load, even if the same tires are used. The smaller the contact load, the smaller the cornering power becomes; and the larger the contact load, the larger the cornering power becomes. That is, the cornering power of the tire largely depends on contact load.

The contact load, however, fluctuates with the on-spring vehicle body vibrations produced by, for example, driver's operation disturbances such as driving, braking, steering, and the like, and disturbance inputs from the road, thereby fluctuating the cornering power. As a result, there is a problem that the posture variation of the vehicle occurs, thereby deteriorating stable traveling and comfort, and affecting the handling and stability.

To solve the above problems, the present inventors studied the fluctuation of the contact loads applied to each of the front and rear wheels by the above-described driver's operation disturbances and road disturbances. This contact load fluctuation at the front and rear wheels will now be described.

The contact load fluctuation at the front and rear wheels is produced by, for example, pitching vibration. The 'pitching' here means a movement that occurs about the vehicle's transverse axis at the center of the vehicle pitching. The energy produced by this pitching vibration is referred to as pitching vibration energy.

The pitching vibration is generated by, for example, a squat under driving (acceleration), a nosedive under braking (deceleration) and during steering (turning), or various disturbance inputs from the road. These states are illustrated in FIG. 23.

Figure 23A:
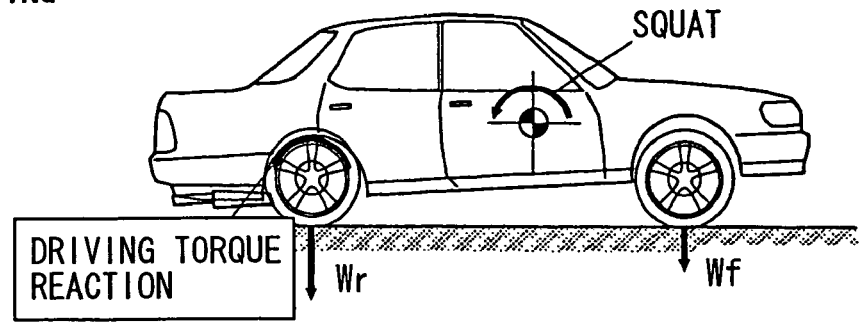
FIGS. 23A-23C are side views of a vehicle accelerating, decelerating, and turning, respectively.
Figure 23B:
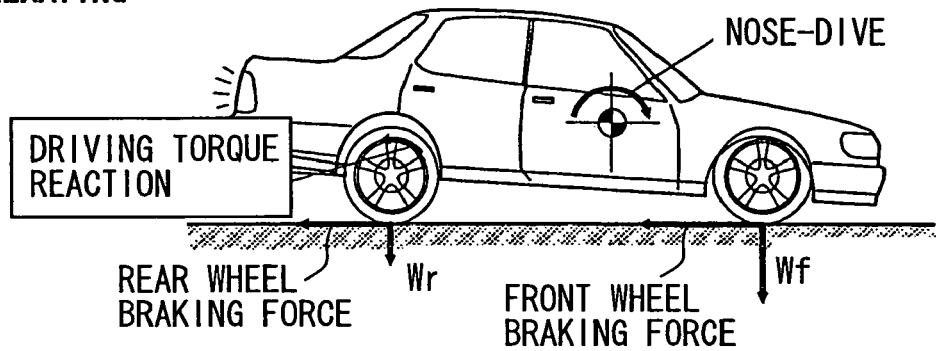
Figure 23C:
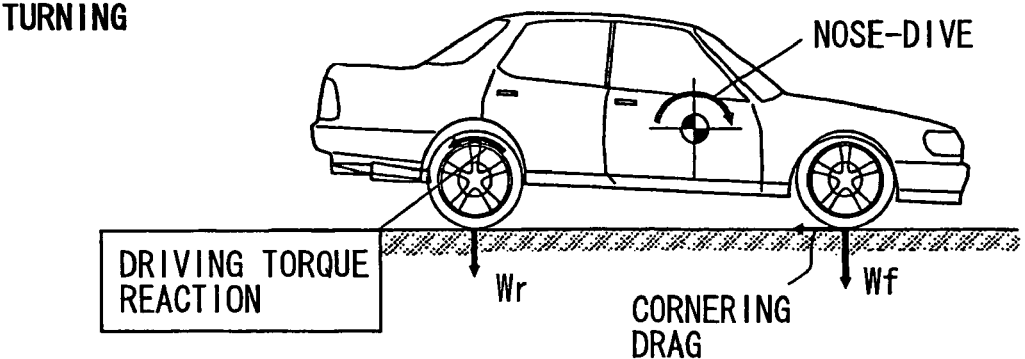

As shown in FIG. 23A, during driving (acceleration), the vehicle body side cannot follow the rotation of the wheels and is left behind, so the front side (nose) of the vehicle is moved upward about the center of the vehicle pitching, resulting in the occurrence of squat. In contrast, during braking (deceleration), as shown in FIG. 23B, braking force acts on the wheels, but the body cannot follow the deceleration of the vehicle due to inertia, so that the front side (nose) of the vehicle is moved downward about the center of the vehicle pitching, resulting in the occurrence of nose-dive. As shown in FIG. 23C, during steering (turn), cornering drag occurs and thereby the wheels are decelerated, so the nose-dive occurs as during braking (deceleration).

Rotational vibrations generated about the center of the vehicle pitching, such as the squat and nose-dive, are pitching vibrations. The energies producing these pitching vibrations are pitching vibration energies, which always occur while the vehicle is traveling.

These pitching vibrations and the like cause the contact loads at each of the front and rear wheels and the relation of forces applied to the wheels to vary in comparison with those when traveling at a constant speed. That is, as shown in FIG. 23A, during the squat, contact load Wf at the front wheel becomes small and contact load Wr at the rear wheel becomes large in comparison with those when traveling at a constant speed, whereby a driving torque reaction becomes large. As shown in FIG. 23B, during the nose-dive under deceleration, contact load Wf at the front wheel becomes large and contact load Wr at the rear wheel becomes small in comparison with those when traveling at a constant speed, whereby braking force on the front wheel becomes large and braking force on the rear-wheel becomes small. As shown in FIG. 23C, also during the nose-dive under turn, contact load Wf at the front wheel becomes large and contact load Wr at the rear wheel becomes small in comparison with those when traveling at a constant speed.

The contact loads Wf and Wr fluctuate as described above, so that the cornering power fluctuates. As a result, a vehicle cannot turn stably and the posture variation of the vehicle occurs, thereby damaging a stable traveling and accordingly a comfortable ride, and affecting the handling and stability.

Figure 24A:
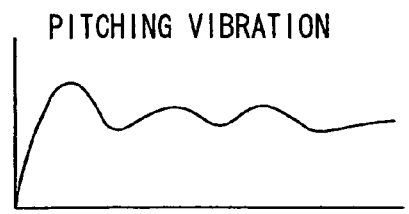
FIGS. 24A-24C are timing charts of a pitching vibration, front and rear wheel contact loads, and front and rear wheel cornering powers, respectively.
Figure 24B:
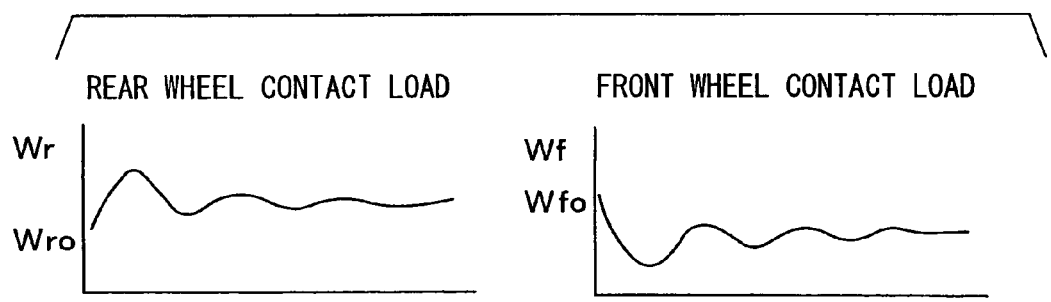

A relationship among the pitching vibration, the front and rear wheel contact loads, and the front and rear wheel cornering powers is illustrated in timing diagrams shown in FIG. 24. When a pitching vibration shown in FIG. 24A occurs, as shown in FIG. 24B, the loads Wf and Wr at the front and rear wheels are obtained by adding suspension reaction variations $\Delta Wf$ and $\Delta Wr$ caused by the pitching vibration to the respective loads Wfo and Wro at the front and rear wheels when traveling at a constant speed, and are given by the following equation 1.

$$Wf = Wfo + \Delta Wf,\ Wr = Wro + \Delta Wr \quad \text{Equation 1}$$

Figure 24C:
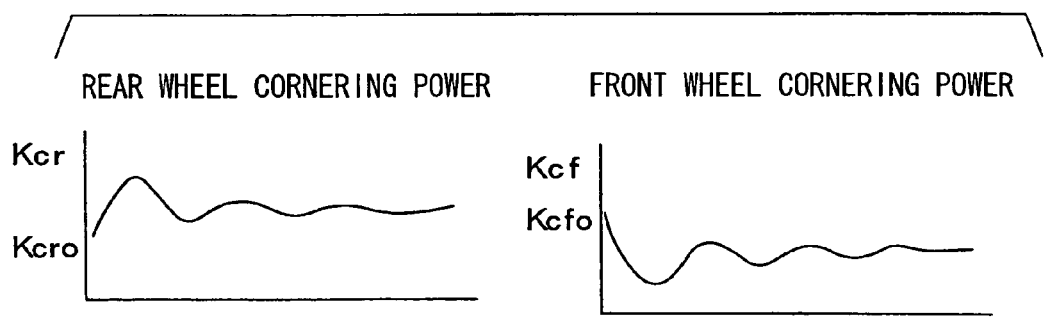

Accordingly, the loads Wf and Wr at the front and rear wheels have waveforms corresponding to the waveform of the pitching vibration. As shown in FIG. 24C, as regard to the cornering powers Kcf and Kcr of the respective front and rear wheels, the cornering powers Kcfo and Kcro of the respective front and rear wheels when traveling at a constant speed also have similar waveforms to those of the loads Wf and Wr at the front and rear wheels because they are obtained by multiplying the respective loads Wf and Wr at the front and rear wheels by a coefficient Cw in the linear region of the tire performance.

Accordingly, if the driving force generated by an engine is corrected on the basis of the contact load variations at the front and rear wheels, which are caused by, for example, the pitching vibration, the effects of the driver's operation disturbances and road disturbances can be suppressed to stabilize the body posture and vehicle performance and improve a comfortable ride and stable traveling of the vehicle.

Next, the inventors studied on the state quantities of a vehicle using an on-spring body vibration model.

The state quantities of the vehicle will be described with reference to a schematic diagram of the on-spring body vibration model shown in FIG. 25.

Figure 25:
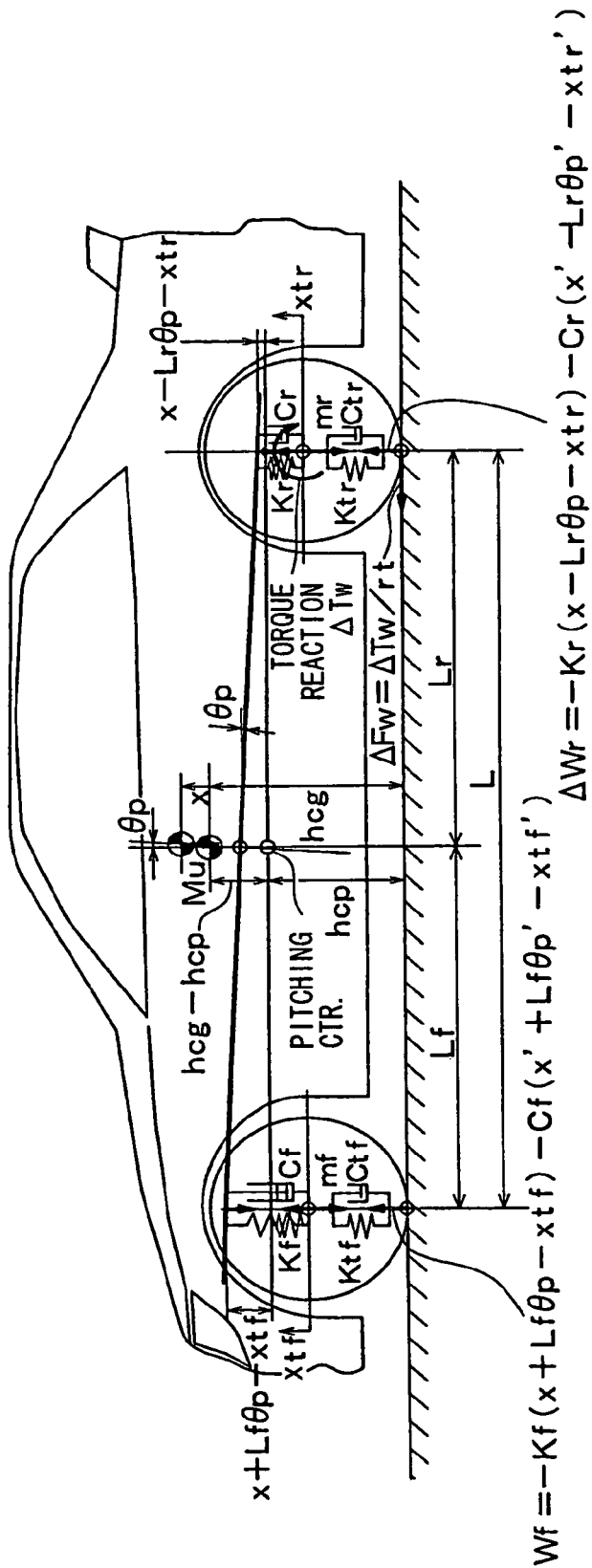
FIG. 25 is a side view of an on-spring vehicle body vibration model.

In the on-spring body vibration model shown in FIG. 25, it is assumed that a vibration about the center of the pitching is produced on the on-spring part in response to a torque reaction variation $\Delta Tw$ with respect to an arbitrary stationary state. In this case, the on-spring body vibration is based on the assumption that the vehicle body is regarded as a plate of an arbitrary reference plane being in parallel with the horizontal direction and the plate is provided with tires supported by suspensions.

In this on-spring body vibration model, constants are defined as follows. First, for the respective front two wheels and rear two wheels, all provided on the reference plane B, spring constants of the suspensions [N/m] are denoted as Kf and Kr, damping coefficients of the suspensions [Ns/m] as Cf and Cr, longitudinal stiffnesses of the tires [N/m] as Ktf and Ktr, and longitudinal damping coefficients of the tires [Ns/m] as Ctf and Ctr.

Further, a radius of the tires is denoted as rt, a vehicle body mass on the spring [kg] as Mu, an unsprung-mass at the front wheel [kg] as mf, an unsprung-mass at the rear wheel [kg] as mr, a wheel base [m] as L, a distance between the center of gravity of the vehicle (center of pitching) and the front wheel shaft [m] as Lf, a distance between the center of gravity of the vehicle and the rear wheel shaft [m] as Lr, height of the center of gravity of the vehicle [m] as hcg, and height of the center of pitching of the body [m] as hcp.

Furthermore, pitching moment of inertia of the body [kgm$^2$] and acceleration of gravity [m/s$^2$] are denoted Ip and g, respectively.

As for independent variables, vertical displacement of the on-spring vehicle body [m] is denoted as x, vertical displacement of the front wheel [m] as xtf, vertical displacement of the rear wheel [m] as xtr, and pitch angle about the virtual pitching center [rad] as θp.

First of all, since the virtual pitch angle about the pitching center is denoted θp, the amounts of displacement about the pitch center at the front wheel shaft located at a distance of Lf from the pitching center and at the rear wheel shaft located at a distance of Lr from the pitching center, are given by Lfθp and Lrθp, respectively. However, since an amount of displacement in the vertical direction of the vehicle body is reduced due to the longitudinal stiffness of the tire, the total amounts of displacement in the vertical direction of the vehicle body are given by x+Lfθp−xtf on the front wheel side and by x−Lfθp−xtr on the rear wheel side.

Therefore, the equation of motion about the pitch center of the vehicle body is expressed by equation 2.

$$Ipθp''=-Lf\{Kf(x+Lfθp-xtf)+Cf(x'+Lfθp'-xtf')\}+Lr\{Kr(x-Lrθp-xtr)+Cr(x'-Lrθp'-xtr')\}+(hcg-hcp)θpMug+\Delta Tw+(hcp+x)\Delta Tw/rt \quad \text{Equation 2}$$

The equation describing the vertical motion of the vehicle body and equations describing the vertical motion at the front and rear wheels are given by equations 3 to 5, respectively.

$$Mux''=-Kf(x+Lfθp-xtf)-Cf(x'+Lfθp'-xtf')-Kr(x-Lθp-xtr)-Cr(x'-Lfθp'-xtr') \quad \text{Equation 3}$$

$$mfxtf''=-Kf(xtf-x-Lfθp)-Cf(xtf'-x'-Lfθp')-Ktfxff-Ctfxtf' \quad \text{Equation 4}$$

$$mrxtr''=-Kr(xtr-x-Lrθp)-Cr(xtr'-x'-Lrθp')-Ktrxtr-Ctrxtr' \quad \text{Equation 5}$$

If these equations 3 to 5 and equation 2 are modified, the following equations 6 to 9 are obtained, respectively.

$$Mux''=-(Kf+Kr)x-(Cr+Cr)x'+Kfxtf+Cfxff+Krxtr+Crxtr'-(KfLf-KrLr)θp-(CfLf-CrLr)θp' \quad \text{Equation 6}$$

$$mfxtf''=Kfx+Cfx'-(Kf+Ktf)xtf-(Cf+Ctf)xtf'+KfLfθp+CfLfθp' \quad \text{Equation 7}$$

$$mrxtr''=Krx+Crx''-(Kr+Ktr)xtr-(Cr+Ctr)xtr''-KrLrθp-CrLrθp'' \quad \text{Equation 8}$$

$$\begin{aligned}Ipθp'' = &-(KfLf-KrLr)x-(CfLf-CrLr)x'+\\&KfLfxtf+CfLfxtf'-KrLrxtr-CrLrxtr'-\\&\{(KfLf^2+KrLr^2)-(hcg-hcp)Mug\}θp-\\&(CfLf^2+CrLr^2)θp'+\\&\{1+(hcp+x)/rt\}\Delta Tw \approx -\\&(KfLf-KrLr)x-(CfLf-CrLr)x'+\\&KfLfxtf+CfLfxtf'-KrLrxtr-CrLrxtr'-\\&\{(KfLf^2+KrLr^2)-(hcg-hcp)Mug\}θp-\\&(Cflf^2+CrLr^2)θp'+(1+hcp/rt)\Delta Tw\end{aligned} \quad \text{Equation 9}$$

Therefore, if these equations are solved with respect to respective x'', xtr'', xtr''', and θp'', these values are described by the parameters indicating the state quantities, such as x, x', xtf, xtf', xtr, xtr', θp, and θp'. Accordingly, if the state quantities are defined such that x1=x, x2=x', x3=xtf, x4=xtf', x5=xtr, x6=xtr', x7=θp, x8=θp', and $\Delta Tw$=u and if the coefficients of the variables in the above equations are replaced to a1 to a8, b1 to b8, c1 to c8, d1 to d8, and p, respectively, the following relationships are obtained.

$$x1'=x'=x2 \quad \text{Equation 10}$$

$$\begin{aligned}x2' = x1'' = x'' = &-(Kf+Kr)/Mu \cdot x - \\&(Cr+Cr)/Mu \cdot x' + \\&Kf/Mu \cdot xtf + Cf/Mu \cdot xtf' + \\&Kr/Mu \cdot xtr + Cr/Mu \cdot xtr' - \\&(KfLf-KrLr)/Mu \cdot θp - \\&(CfLf-CrLr)/Mu \cdot θp' \\= &a1 \times 1 + a2 \times 2 + a3 \times 3 + \\&a4 \times 4 + a5 \times 5 + a6 \times 6 + \\&a7 \times 7 + a8 \times 8\end{aligned} \quad \text{Equation 11}$$

$$x3' = xtf' = x4 \quad \text{Equation 12}$$

-continued $$x4' = x''3 = xtf'' = Kf/mf \cdot x + Cf/mf \cdot x' - \\
(Kf + Ktf)/mf \cdot xtf - \\
(Cf + Ctf)/mf \cdot xtf' + \\
KfLf/mf \cdot \theta p + CfLf/mf \cdot \theta p' \\
= b1 \times 1 + b2 \times 2 + b3 \times 3 + \\
b4 \times 4 + b7 \times 7 + b8 \times 8$$

Equation 13

$$x5' = xtr' = x6$$

Equation 14

$$x6' = x5'' = xtr'' = Kr/mr \cdot x + Cr/mr \cdot x' - \\
(Kr + Ktr)/mr \cdot xtr - \\
(Cr + Ctr)/mr \cdot xtr' - \\
KrLr/mr \cdot \theta p - CrLr/mr \cdot \theta p' \\
= c1 \times 1 + c2 \times 2 + c5 \times 5 + \\
c6 \times 6 + c7 \times 7 + c8 \times 8$$

Equation 15

$$x7' = \theta p' = x8$$

Equation 16

$$x8' = x7'' = \theta p'' = -(KfLf - KrLr)/Ip \cdot x - \\
(CfLf - CrLr)/Ip \cdot x' + \\
KfLf/Ip \cdot xtf + CfLf/Ip \cdot xtf' - \\
KrLr/Ip \cdot xtr - CrLr/Ip \cdot xtr' - \\
\{(KfLf^2 + KrLr^2) - \\
(hcg - hcp)Mug\}/Ip \cdot \theta p - \\
(CfLf^2 + CrLr^2)/Ip \cdot \theta p' + \\
(1 + hcp/rt)/Ip \cdot \Delta Tw \\
= d1 \times 1 + d2 \times 2 + d3 \times 3 + \\
d4 \times 4 + d5 \times 5 + d6 \times 6 + \\
d7 \times 7 + d8 \times 8 + pu$$

Equation 17

In the above equation 11, a1=−(Kf+Kr)Mu, a2=−(Cf+Cr)/Mu, a3=Kf/Mu, a4=Cf/Mu, a5=Kr/Mu, a6=Cr/Mu, a7=−(KfLf−KrLr)/Mu, and a8=−(CfLf−CrLr)/Mu.

In equation 13, b1=Kf/mf, b2=Cf/mf, b3=−(Kf+Ktf)/mf, b4=−(Cf+Ctf)/mf, b7=KfLf/mf, and b8=CfLf/mf.

In equation 15, c1=Kr/mr, c2=Cr/mr, c5=−(Kr+Ktr)/mr, c6=−(Cr+Ctr)/mr, c7=−KrLr/mr, and c8=−CrLr/mr.

In equation 17, d1=−(KfLf−KrLr)/Ip, d2=−(CfLf−CrLr)/Ip, d3=KfLf/Ip, d4=CfLf/Ip, d5=−KrLr/Ip, d6=−CrLr/Ip, d7=−{(KfLf²+KrLr²)−(hcg−hcp)Mug}/Ip, d8=−(CfLf²+CrLr²)/Ip, and p=1+hcp/rt)/Ip.

Therefore, if equations 10 to 17 are described by a state space model, the equation of state is given by an eight by eight determinant as shown in equation 18, which is simplified to equation 19.

$$\underbrace{\begin{bmatrix} x1' \\ x2' \\ x3' \\ x4' \\ x5' \\ x6' \\ x7' \\ x8' \end{bmatrix}}_{x'} = \underbrace{\begin{bmatrix} 0 & 1 & 0 & 0 & 0 & 0 & 0 & 0 \\ a1 & a2 & a3 & a4 & a5 & a6 & a7 & a8 \\ 0 & 0 & 0 & 1 & 0 & 0 & 0 & 0 \\ b1 & b2 & b3 & b4 & 0 & 0 & b7 & b8 \\ 0 & 0 & 0 & 0 & 0 & 1 & 0 & 0 \\ c1 & c2 & 0 & 0 & c5 & c6 & c7 & c8 \\ 0 & 0 & 0 & 0 & 0 & 0 & 0 & 1 \\ d1 & d2 & d3 & d4 & d5 & d6 & d7 & d8 \end{bmatrix}}_{A} \underbrace{\begin{bmatrix} x1 \\ x2 \\ x3 \\ x4 \\ x5 \\ x6 \\ x7 \\ x8 \end{bmatrix}}_{x} +$$

Equation 17

$$\underbrace{\begin{bmatrix} 0 \\ 0 \\ 0 \\ 0 \\ 0 \\ 0 \\ 0 \\ p \end{bmatrix}}_{B} u$$

$$x' = Ax + Bu$$

Equation 19

The equation of state in the on-spring body vibration model is thus obtained.

Accordingly, if axle torque (a physical quantity corresponding to the driving force) generated by the engine is corrected on the basis of this equation of state, the effects of the driver's operation disturbances and road disturbances may be suppressed to stabilize the body posture and vehicle performance and improve a comfortable ride and stable traveling of the vehicle.

Therefore, the inventors considered which state quantities should be controlled using the above equation of state.

The first thing to be considered is to control the pitching vibration. That is, since the pitching vibration is a factor to cause the fluctuations of the front and rear wheel contact loads to occur, if it is suppressed, the fluctuations of the front and rear wheel contact loads can be suppressed, so that the variation of the cornering power can be prevented. Therefore, it suffices for the pitching vibration to be suppressed such that the variation of the state variable $\theta p$ or the derivative of the state variable $\theta p$ with respect to time ($d\theta p/dt = \theta p'$) is quickly reduced to zero. The output equation, which is the derivative of this state variable $\theta p$ with respect to time, is obtained from the equation of state given by equations 17 and 18 as follows.

$$y = x8 = \underbrace{[0\ 0\ 0\ 0\ 0\ 0\ 0\ 1]}_{c} \begin{bmatrix} x1 \\ x2 \\ x3 \\ x4 \\ x5 \\ x6 \\ x7 \\ x8 \end{bmatrix} = Cx$$

Equation 18

Next thing to be considered is to suppress the fluctuation of the front or rear wheel contact load due to the pitching vibration. If the fluctuation of the front or rear wheel contact load is suppressed, the variation of the cornering power can be prevented.

Since the variations ΔWf and ΔWr of these front and rear wheel contact loads equal to the variations of the respective suspension reactions, they are given by the following equations.

$$\Delta Wf = -Kf(x + Lf\theta p - xtf) - \quad \text{Equation 21}$$
$$Cf(x' + Lf\theta p' - xtf')$$
$$= -Kfx1 - Cfx2 + Kfx3 + Cfx4 - KfLfx7 - CfLfx8$$

$$\Delta Wr = -Kr(x + Lr\theta p - xtr) - \quad \text{Equation 22}$$
$$Cr(x' + Lr\theta p' - xtr')$$
$$= -Krx1 - Crx2 + Krx5 + Crx6 - KrLrx7 - CrLrx8$$

Suppressing the variations of the front and rear wheel contact loads is equivalent to reducing dynamic variations quickly to zero, which are described by the derivative terms of the variations of the front and rear wheel contact loads (in the above equations 20 and 21). These derivative terms $\Delta Wfd$ and $\Delta Wrd$ are given by the following equations.

$$\Delta Wfd = -Cf(x' + Lf\theta p' - xtf') \quad \text{Equation 23}$$
$$= Cfx2 - Cfx4 - CfLfx8$$

$$\Delta Wrd = -Cr(x'Lr\theta p' - xtr') \quad \text{Equation 24}$$
$$= -Crx2 + Crx6 - CrLrx8$$

Accordingly, the output equations for the derivative terms $\Delta Wfd$ and $\Delta Wrd$ of the variations of the front and rear wheel contact loads are given by the following equations 25 and 26, respectively, where $e2f=-Cf$, $e4f=Cf$, and $e8f=-CfLf$ in equation 25, and $e2r=-Cr$, $e6r=Cr$, and $e8r=CrLr$ in equation 26.

$$y = -Cfx2 + Cfx4 - CfLfx8 \quad \text{Equation 25}$$
$$= \underbrace{[0 \; e2f \; 0 \; e4f \; 0 \; 0 \; 0 \; e8f]}_{c} \begin{bmatrix} x1 \\ x2 \\ x3 \\ x4 \\ x5 \\ x6 \\ x7 \\ x8 \end{bmatrix}$$
$$= Cx$$

$$y = -Cfr2 + Crx6 + CrLrx8 \quad \text{Equation 26}$$
$$= \underbrace{[0 \; e2r \; 0 \; 0 \; 0 \; e6r \; 0 \; e8r]}_{c} \begin{bmatrix} x1 \\ x2 \\ x3 \\ x4 \\ x5 \\ x6 \\ x7 \\ x8 \end{bmatrix}$$
$$= Cx$$

Another thing to be considered is to suppress vehicle body vibration in the vertical direction. Since the vehicle body vibration in the vertical direction is also a factor to cause the fluctuations of the front and rear wheel contact loads to occur, if it is suppressed, the fluctuations of the front and rear wheel contact loads can be suppressed, so that the variation of the cornering power can be prevented. Since the vehicle body vibration in the vertical direction is given by the state variable x, it suffices that the variation of the state variable x or the derivative of the state variable x with respect to time (dx/dt=x') is quickly reduced to zero. The output equation for the derivative of this state variable x with respect to time is obtained from the equation of state given by equations 18 and 19 as follows.

$$y = x2 = \underbrace{[0 \; 1 \; 0 \; 0 \; 0 \; 0 \; 0 \; 0]}_{c} \begin{bmatrix} x1 \\ x2 \\ x3 \\ x4 \\ x5 \\ x6 \\ x7 \\ x8 \end{bmatrix} = Cx. \quad \text{Equation 27}$$

Next, the vehicle stability control system that utilizes the above consideration regarding the on-spring body model and its related equations will be explained below as examples.

FIRST EXAMPLE

The vehicle stability control system according to the first example will be described with reference to FIG. 14, which schematically illustrates its structure. The present example will be described assuming a vehicle with a rear-wheel drive, but it is also applicable to a vehicle with a front-wheel drive or a four-wheel drive.

The vehicle stability control system of the first example adjusts driving torque generated by an engine 201 installed in a vehicle to stabilize the fluctuation of cornering power according to the fluctuation of front and rear wheel loads caused by pitching vibration energy and other energies, thereby stabilizing the vehicle body posture and vehicle performance.

Figure 14:
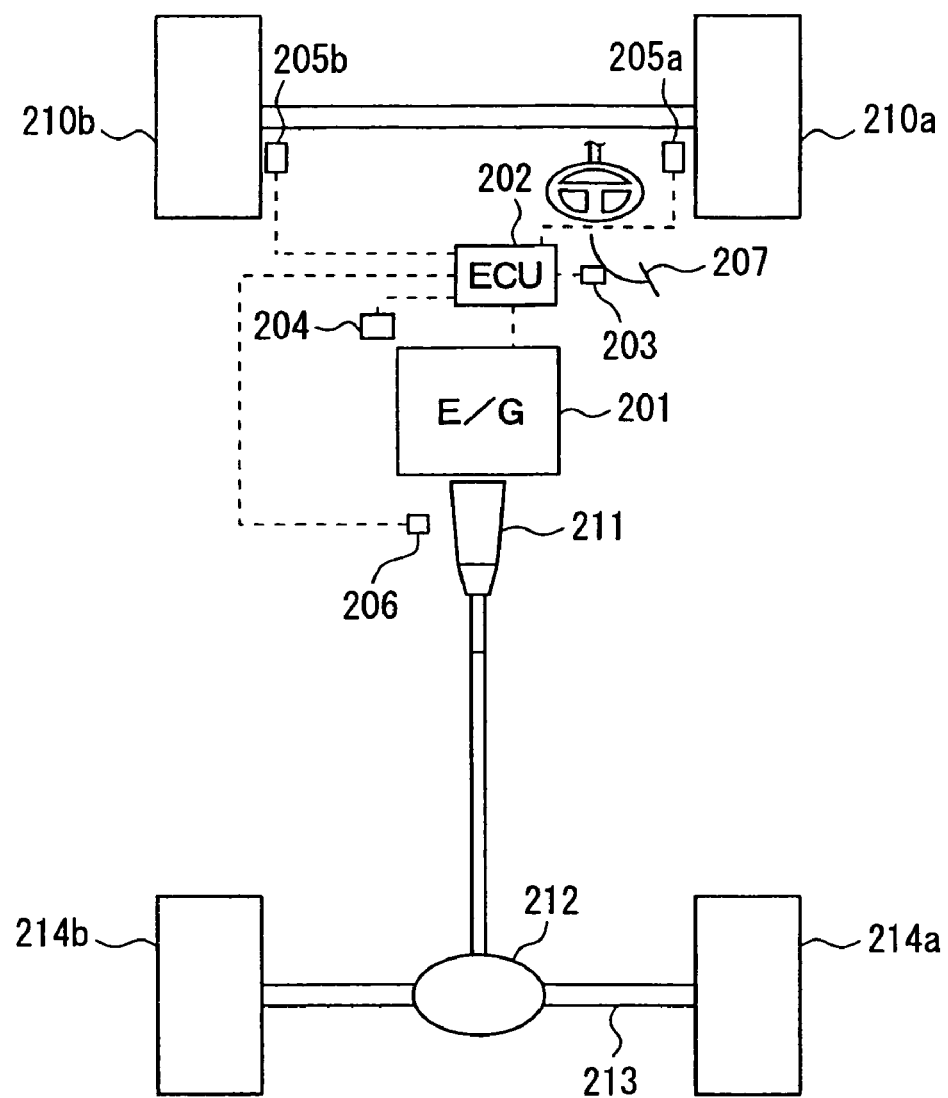
FIG. 14 is a top view of a vehicle stability control system according to one example adapted to a vehicle.

In the vehicle stability control system shown in FIG. 14, the engine 201 is controlled by an engine ECU 202. The engine ECU 202 receives detection signals from an acceleration stroke sensor 203, an engine speed sensor 204, front wheel speed sensors 205a and 205b, and a gear position sensor 206.

The acceleration stroke sensor 203 outputs a detection signal that corresponds to a position of an accelerator pedal 207. The engine ECU 202 determines an accelerator manipulated variable on the basis of the detection signal from the acceleration stroke sensor 203.

The engine speed sensor 204 is a known sensor installed in the engine 201 and outputs a detection signal that corresponds to the engine rotational speed.

In the engine ECU 202, a base required engine torque that becomes an engine torque desired by the driver is calculated from the detection signal from the engine speed sensor 204 and the accelerator manipulated variable obtained from the detection signal from the acceleration stroke sensor 203.

The front wheel speed sensors 205a and 205b are installed in the respective front wheels 210a and 210b, which become steering wheels, and comprise the wheel speed sensor 205a for the right front wheel and the wheel speed sensor 205b for the left front wheel. Each of these wheel speed sensors 205a and 205b can be a known type sensor such as, for example, an electromagnetic pickup type that outputs a different detection signal according to the rotation of the gear of a gear type rotor installed at the axel, and generates a detection signal according to the rotation of the front wheel. The detection signals from the front wheel speed sensors 205a and 205b are used for obtaining a running resistance disturbance at the front wheel, which is produced according to the front wheel speed.

The gear position sensor 206 detects a current gear position. The detection signal from the gear position sensor 206 is input to the engine ECU 202 in which a gear ratio depending on the current gear position is obtained from the input detection signal.

The engine ECU 202 then performs various computations on the basis of the detection signals from these sensors 203, 204, 205a, 205b, and 206, and adjusts engine power on the basis of the computation results. The axle torque is thereby adjusted and transmitted through a transmission 211, a final reduction gear 212, and a driving axle 213 to rear wheels 214a and 214b, which become driving wheels.

The engine ECU 202 will be described in detail with reference to FIG. 15, which is a block diagram schematically illustrating this engine ECU 202.

The engine ECU 202 comprises a microcomputer having, for example, a CPU, a RAM, a ROM and I/O ports. The CPU executes an engine control program stored in the ROM and performs various computations, whereby the engine power is controlled by the engine 201.

Figure 15:
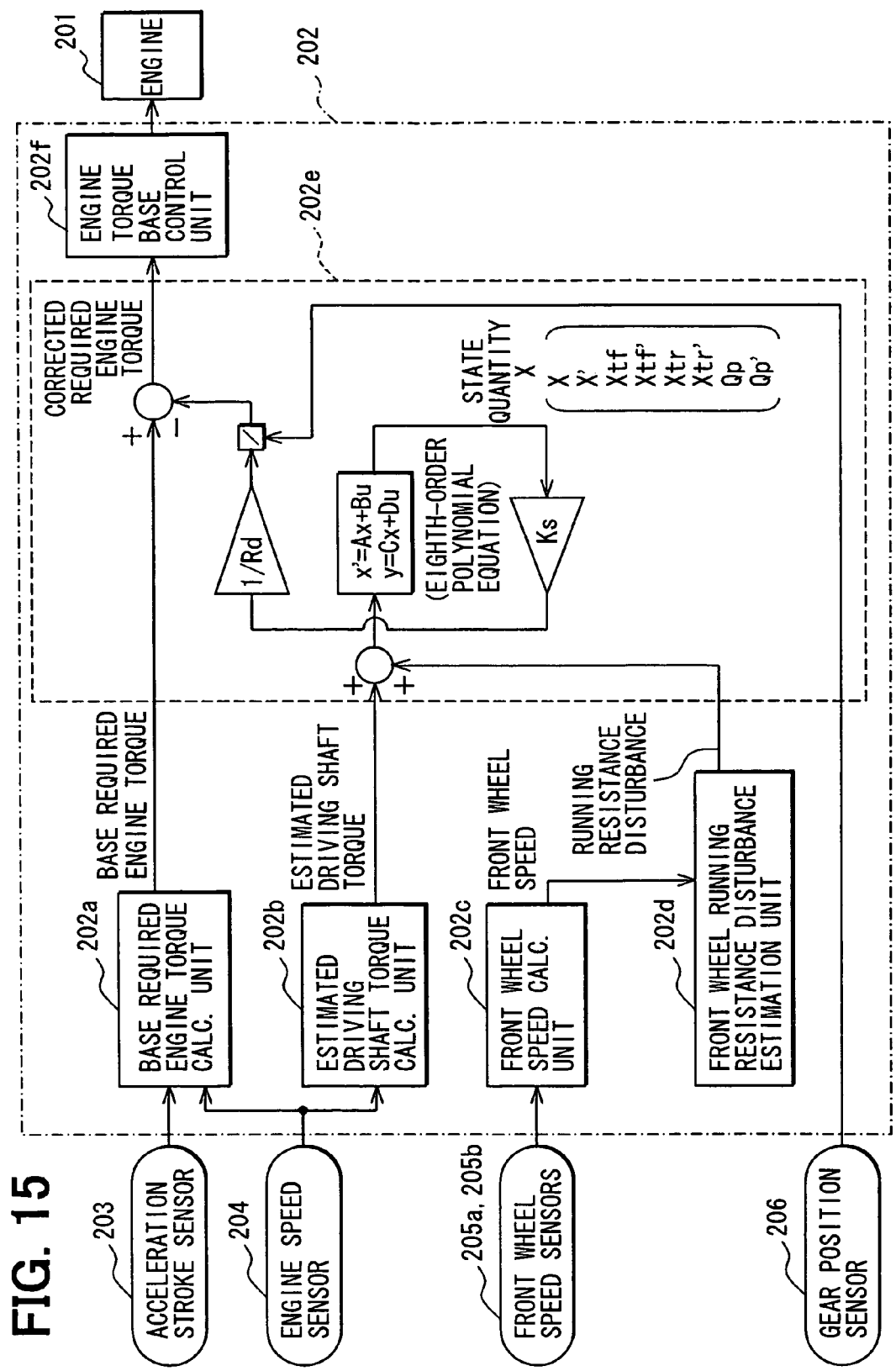
FIG. 15 is a block diagram of an engine electronic control unit of the vehicle stability control system shown in FIG. 14.

Specifically, as shown in FIG. 15, the engine ECU 202 comprises a base required engine torque calculation unit 202a, an estimated driving shaft torque calculation unit 202b, a front wheel speed calculation unit 202c, a front wheel running resistance disturbance estimation unit 202d, a required engine torque correction unit 202e, and an engine torque base control unit 202f.

The base required engine torque calculation unit 202a receives the detection signal output from the pedal stroke sensor 203, and obtains an accelerator manipulated variable as a physical quantity on the basis of this detection signal. In addition, it obtains a base required engine torque corresponding to a base required driving force on the basis of the manipulated variable and the detection signal output from the engine speed sensor 204. The base required engine torque obtained here becomes an engine torque used for accelerating and decelerating the vehicle, that is, becomes an engine shaft torque that is basically required. The base required engine torque calculation unit 202a outputs its calculation result to the required engine torque correction unit 202e.

On the basis of the detection signal from the engine speed sensor 204, the estimated driving shaft torque calculation unit 202b calculates an estimated driving shaft torque, that is, calculates a driving shaft torque that appears to be being generated when the detection signal is received. The estimated driving shaft torque calculation unit 202b also outputs its calculation result to the required engine torque correction unit 202e.

The front wheel speed calculation unit 202c calculates wheel speeds of both front wheels, which become steering wheels, on the basis of the detection signals from both the wheel speed sensors 205a and 205b. The output of the front wheel speed calculation unit 202c is connected to the front wheel running resistance disturbance estimation unit 202d.

The front wheel running resistance disturbance estimation unit 202d estimates a front wheel running resistance disturbance on the basis of the calculated front wheel speed. A running resistance occurs at the front wheel according to wheel speed. Thus, its running resistance disturbance is estimated from the wheel speed. Multiplying the derivative value of the wheel speed by the vehicle weight, for example, can obtain force [N/m] in the translation direction, and further multiplying it by the radius of the rolling wheel can obtain the running resistance disturbance as a moment [N] acting on the rolling wheel.

Obtaining a running resistance disturbance on the basis of the first-order derivative of the wheel speed can make it possible to obtain an amount of, as a result, the running resistance disturbance being received, regardless of the cause of the running resistance disturbance. The running resistance disturbance occurs because of, for example, the cornering drag caused by driver's steering and the roughness of the road. In any case, however, since the running resistance disturbance results in the variation of the wheel speed, if it is calculated from the variation (derivative value) of the wheel speed, the running resistance disturbance received by the rotating wheel can be obtained regardless of its cause.

This running resistance disturbance can also be estimated in such a way that characteristics between the wheel speed and running resistance disturbance are stored in the memory of the engine ECU 202 in advance and the running resistance disturbance corresponding to the calculated wheel speed is selected based on the characteristics.

The required engine torque correction unit 202e estimates a current driving torque by adding the estimated driving shaft torque calculated by the estimated driving shaft torque calculation unit 202b and the running resistance disturbance obtained in the front wheel running resistance disturbance estimation unit 202d. The required engine torque correction unit 202e uses the current driving torque as an input to obtain a correction, which is necessary for suppressing the pitching vibration, from the equation of state in the on-spring vehicle body vibration model, and then, based on the correction, corrects the base required engine torque calculated by the base required engine torque calculation unit 202a.

Specifically, if the current driving torque is estimated, each state quantity of various on-spring vehicle body vibrations having an excitation source created by the driving torque reaction to the current driving torque can be estimated on the basis of the equation of state given by equations 218 and 219. In the present example, by substituting each estimated state quantity into the output equation of the pitching vibration given by equation 220, the pitching vibration and a correction to be able to suppress this pitching vibration are obtained.

More specifically, as shown in FIG. 15, the output y (=x8) indicating a variation of the pitching vibration corresponding to the estimated driving torque is obtained from the vehicle body vibration model. By multiplying this output y by a predetermined state feedback gain Ks, the correction is obtained. The state feedback gain Ks here is set according to the number of the state quantities K1 to K8, and is obtained by an optimal regulator design method with respect to each of the state quantities x (x, x', xtf, xtf', xtr, xtr', Qp, Qp') calculated using the vehicle body vibration model.

The correction obtained as described above is multiplied by the speed reducing ratio (differential ratio: 1/Rd) of the final reduction gear 212 and then is divided by the gear ratio in the transmission 211, which is obtained on the basis of the detection signal output from the gear position sensor 206. The resulting value is subtracted from the base required torque calculated by the base required torque calculation unit 202a.

The correction of the engine torque is thereby obtained as an absolute value with respect to the base required engine torque. The absolute value is used as a corrected required engine torque, which is in turn input to the engine torque base control unit 202f.

The engine torque base control unit 202f sets the amount of intake air, amount of fuel injection, and ignition timing of the engine 201 so as to obtain the corrected required engine torque, and generates corresponding output signals. The output signals are transmitted to each part of the engine 201 to adjust the amount of intake air, amount of fuel injection, and ignition timing, thereby outputting the energy by which the corrected required engine torque can be obtained.

This energy is then transmitted as the rotational energy through the transmission 211 and the final reduction gear 212, etc., to the driving wheels 214a and 214b at which the axle torque is generated according to the corrected required engine torque.

As described above, according to the vehicle stability control system of the example, various on-spring body vibrations are estimated using the vehicle body vibration model, and the required engine torque corresponding to the required driving force is corrected so as to suppress the pitching vibration which is one of the on-spring body vibrations.

Therefore, the pitching vibration is timely suppressed so as to reduce the effects of ever-changing various disturbances caused by driver's operation and road condition, etc., so that each state quantity (or condition) of the vehicle can be stabilized, as well as traveling.

Figure 16:
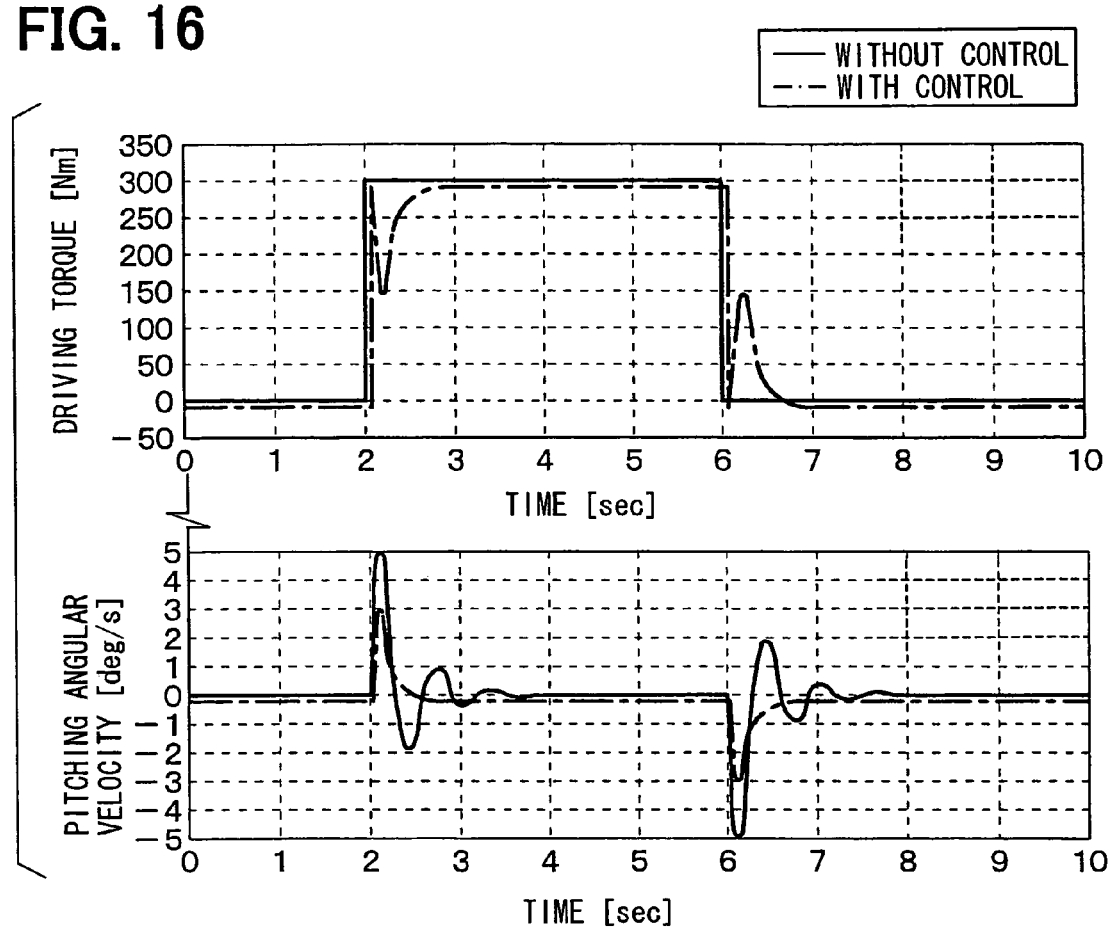
FIG. 16 is a pair of graphs illustrating the results of a simulation involving a varying pitching angular velocity and a varying driving torque.

As a reference, a simulation result on the variation of the pitching angular velocity with respect to the variation of the driving torque is shown in FIG. 16. It should be appreciated from this FIG. 16 that the pitching angular velocity under control by the system of the present example has a small amplitude and is quickly stabilized in comparison to that without the control.

Accordingly, the present example can stabilize the vehicle body in response to variations in the driver's operational disturbance and road disturbances, etc., thereby maintaining the body posture and improving vehicle performance and ride quality and traveling stability.

SECOND EXAMPLE

A second example will now be described. In the above first example described above, to suppress the pitching vibration, a correction is obtained by which the variation of the pitching vibration is quickly reduced to zero. In contrast, in the second example, to suppress the fluctuation of the front wheel contact load, the derivative term $\Delta Wfd$ of the variation of the front wheel contact load is quickly reduced to zero. Since the structure of the vehicle stability control system of the present example is the same as that of the first example shown in FIGS. 14 and 16, only different points from the first example will be described here.

In the vehicle stability control system of the second example, only the process in the required engine torque correction unit 202e is performed differently from the first example. That is, in the vehicle stability control system according to the present example, first the required engine torque correction unit 202e obtains a current driving torque by the same method as the first example. Then, using the current driving torque as an input, a correction necessary for suppressing the fluctuation of the front wheel contact load is obtained from the equation of state in the on-spring vehicle body vibration model, and the base required engine torque calculated by the base required engine torque calculation unit 202b is corrected on the basis of the correction.

Specifically, if the current driving torque is estimated, each state quantity of various on-spring vehicle body vibrations having an excitation source created by the driving torque reaction to the current driving torque can be estimated on the basis of the equations of state given by equations 18 and 19. In the present example, by substituting each estimated state quantity into the output equation of the derivative term $\Delta Wfd$ of the variation of the front wheel contact load, given by equation 25, the derivative term $\Delta Wfd$ is obtained and then a correction to be able to suppress this variation is obtained.

The correction is obtained in the same way as in the first example. This correction is multiplied by the speed reducing ratio of the final reduction gear 212 and then is divided by the gear ratio in the transmission 211. The resulting value is subtracted from the base required torque calculated by the base required torque calculation unit 202a.

The correction of the engine torque is thereby obtained as an absolute value with respect to the base required engine torque, and the absolute value is used as a corrected required engine torque.

As described above, according to the vehicle stability control system of the second example, various on-spring vehicle body vibrations are estimated using the vehicle body vibration model, and the required engine torque corresponding to the required driving force is corrected so as to suppress the variation of the front wheel contact load.

Therefore, the effects of ever-changing various disturbances caused by a driver's operation and road conditions, etc., are reduced to timely suppress the fluctuation of the front wheel contact load, so that each state quantity (or condition) of a vehicle can be stabilized. Traveling of the vehicle can also be thereby stabilized.

Figure 17:
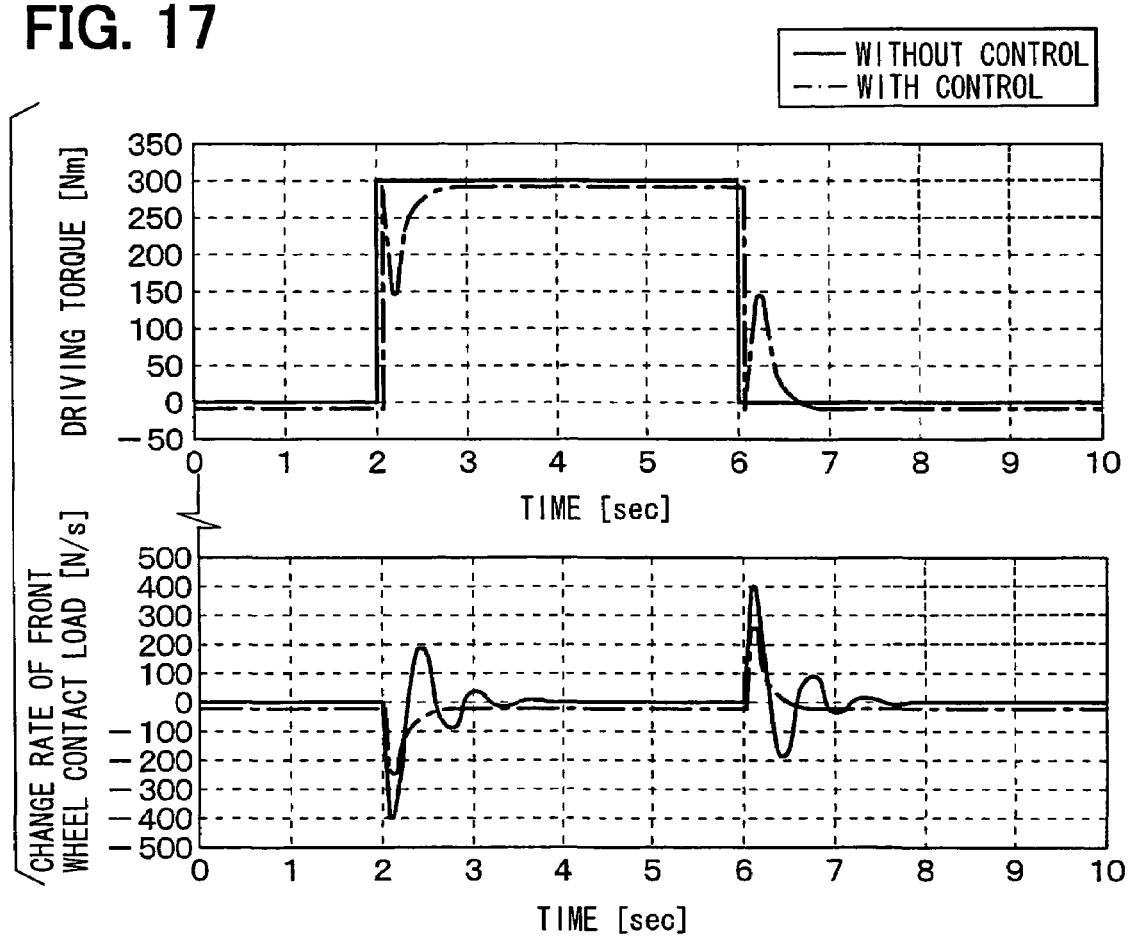
FIG. 17 is a pair of graphs illustrating the results of a simulation involving a change rate of a front wheel contact load and a varying driving torque.

As a reference, a simulation result on the variation of the change rate of the front wheel contact load with respect to the variation of the driving torque is shown in FIG. 17. It should be appreciated from this drawing that the change rate of the front wheel contact load under control by the system of the second example has a small amplitude and is quickly stabilized in comparison with that without the control.

Accordingly, the second example can prevent the fluctuation of the body stability caused by driver's operation disturbance and road disturbance etc. from damaging the body posture and vehicle performance to improve the ride quality and traveling stability of a vehicle.

THIRD EXAMPLE

A third example will now be described. In the second example, the fluctuation of the front wheel contact load is suppressed whereas, in the third example, the derivative term $\Delta Wrd$ of the variation of the rear wheel contact load is quickly reduced to zero to suppress the fluctuation of the rear wheel contact load. Since the structure of the vehicle stability control system of the present example is also the same as that of the first example shown in FIGS. 14 and 15, only different points from the first example will be described here.

In the vehicle stability control system of the present example, only the process in the required engine torque correction unit 202e is performed differently from the first example. That is, in the vehicle stability control system according to the present example, first the required engine torque correction unit 202e obtains a current driving torque by the same method as the first example. Then, using the current driving torque as an input, a correction necessary for suppressing the fluctuation of the rear wheel contact load is obtained from the equation of state in the on-spring vehicle body vibration model, and the base required engine torque calculated by the base required engine torque calculation unit 202b is corrected on the basis of the correction.

Specifically, if the current driving torque is estimated, each state quantity of various on-spring vehicle body vibrations having an excitation source created by the driving torque reaction to the current driving torque can be estimated on the basis of the equations of state given by equations 18 and 19. In the present example, by substituting each estimated state quantity into the output equation of the derivative term $\Delta Wrd$ of the variation of the rear wheel contact load, given by equation 26, the derivative term ΔWrd is obtained and then a correction to be able to suppress this variation is obtained.

The correction is obtained in the same way as in the first example. This correction is multiplied by the speed reducing ratio of the final reduction gear 212 and then is divided by the gear ratio in the transmission 211. The resulting value is subtracted from the base required torque calculated by the base required torque calculation unit 202*a*.

The correction of the engine torque is thereby obtained as an absolute value with respect to the base required engine torque, and the absolute value is used a corrected required engine torque.

As described above, according to the vehicle stability control system of the example, various on-spring vehicle body vibrations are estimated using the vehicle body vibration model, and the required engine torque corresponding to the required driving force is corrected so as to suppress the variation of the rear wheel contact load.

Therefore, the effects of ever-changing various disturbances caused by driver's operation and road condition etc. are reduced to timely suppress the fluctuation of the rear wheel contact load, so that each state quantity (or condition) of a vehicle can be stabilized. Traveling of the vehicle can thereby be stabilized.

Figure 18:
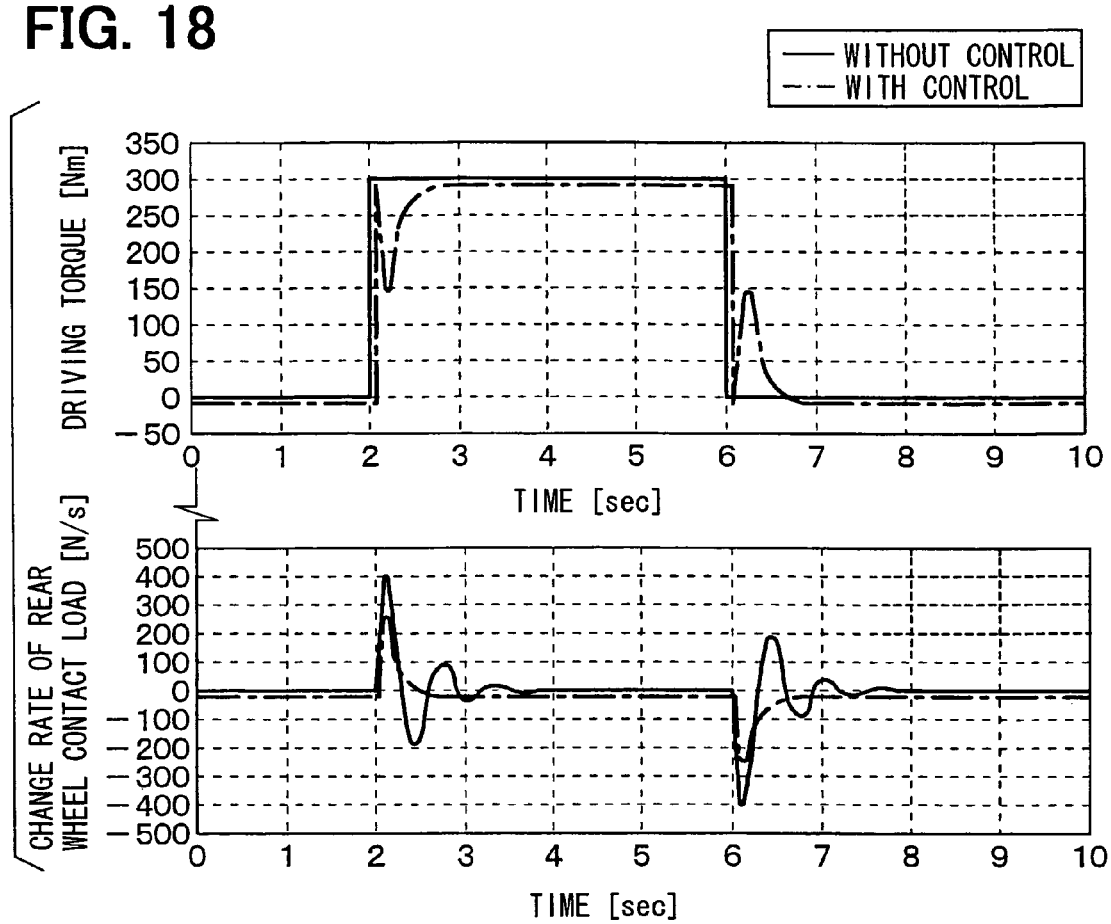
FIG. 18 is a pair of graphs illustrating the results of a simulation involving a change rate of the rear wheel contact load and a varying driving torque.

As a reference, a simulation result on the variation of the change rate of the rear wheel contact load with respect to the variation of the driving torque is shown in FIG. 18. It should be appreciated from this drawing that the change rate of the rear wheel contact load with control by the example has a small amplitude and is quickly stabilized in comparison with that without the control.

Accordingly, the present example can prevent the fluctuation of the body stability caused by driver's operation disturbance and road disturbance etc. from damaging the body posture and vehicle performance to improve the ride quality and traveling stability of a vehicle.

FOURTH EXAMPLE

A fourth example will now be described. In the present example, to suppress the vertical motion of the vehicle body, its variation is quickly reduced to zero. Since the structure of the vehicle stability control system of the present example is also the same as that of the first example shown in FIGS. 14 and 15, only different points from the first example will be described here.

In the vehicle stability control system of the present example, only the process in the required engine torque correction unit 202*e* is performed differently from the first example. That is, in the vehicle stability control system according to the present example, first the required engine torque correction unit 202*e* obtains a current driving torque by the same method as the first example. Then, using the current driving torque as an input, a correction necessary for suppressing the fluctuation of the vertical motion of the vehicle body is obtained from the equation of state in the on-spring vehicle body vibration model, and the base required engine torque calculated by the base required engine torque calculation unit 202*b* is corrected on the basis of the correction.

Specifically, if the current driving torque is estimated, each state quantity of various on-spring vehicle body vibrations having an excitation source created by the driving torque reaction to the current driving torque can be estimated on the basis of the equations of state given by equations 18 and 19. In the present example, by substituting each estimated state quantity into the output equation of the variation x' (=x2) of the vertical motion of the vehicle body, given by equation 27, the variation of the vertical motion of the vehicle body is obtained and then a correction to be able to suppress this variation is obtained.

The correction is obtained in the same way as in the first example. This correction is multiplied by the speed reducing ratio of the final reduction gear 212 and then is divided by the gear ratio in the transmission 211. The resulting value is subtracted from the base required torque calculated by the base required torque calculation unit 202*a*.

The correction of the engine torque is thereby obtained as an absolute value with respect to the base required engine torque, and the absolute value is used as a corrected required engine torque.

As described above, according to the vehicle stability control system of the example, various on-spring vehicle body vibrations are estimated using the vehicle body vibration model, and the required engine torque corresponding to the required driving force is corrected so as to suppress the fluctuation of the vertical motion of the vehicle body.

Therefore, the effects of ever-changing various disturbances caused by driver's operation and road condition etc. are reduced to timely suppress the fluctuation of the vertical motion of the vehicle body. Each state quantity (or dondition) of a vehicle can thereby be stabilized as if the vehicle were pressed from above, so that traveling of the vehicle can be stabilized.

Figure 19:
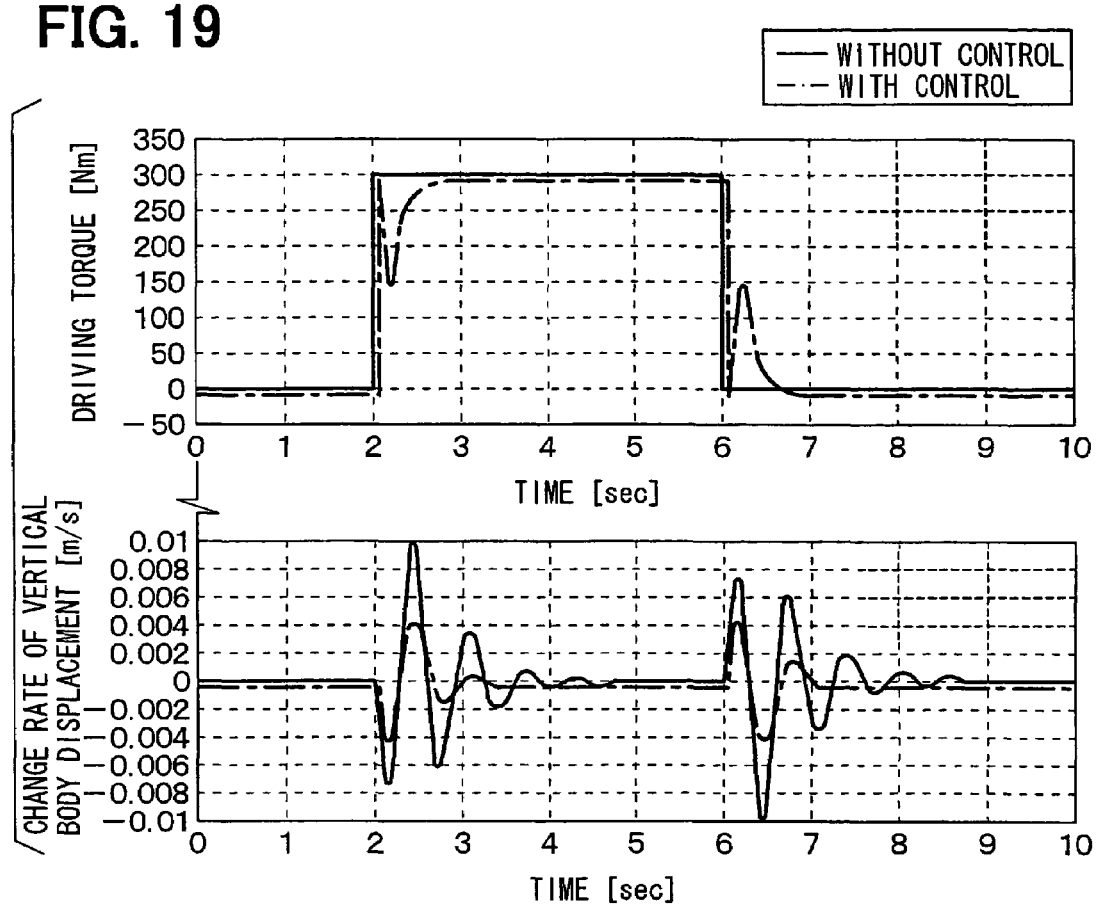
FIG. 19 is a pair of graphs illustrating the results of a simulation involving a vertical displacement change rate of a vehicle body and a varying driving torque.

As a reference, a simulation result on the variation of the change rate of the vertical displacement of the vehicle body with respect to the variation of the driving torque is shown in FIG. 19. It should be appreciated from this drawing that the change rate of the vertical displacement of the vehicle body with control by the example has a small amplitude and is quickly stabilized in comparison with that without the control.

Accordingly, the example can prevent the fluctuation of the body stability caused by driver's operation disturbance and road disturbance, etc., from damaging the body posture and vehicle performance to improve the ride quality and traveling stability of a vehicle.

OTHER EXAMPLES (1) The above examples have been described as having an engine torque based control mode, but this is shown as only one of a plurality of exemplary parameters that determine the driving force. Thus, the examples are not limited to this engine torque based control mode.

Figure 20:
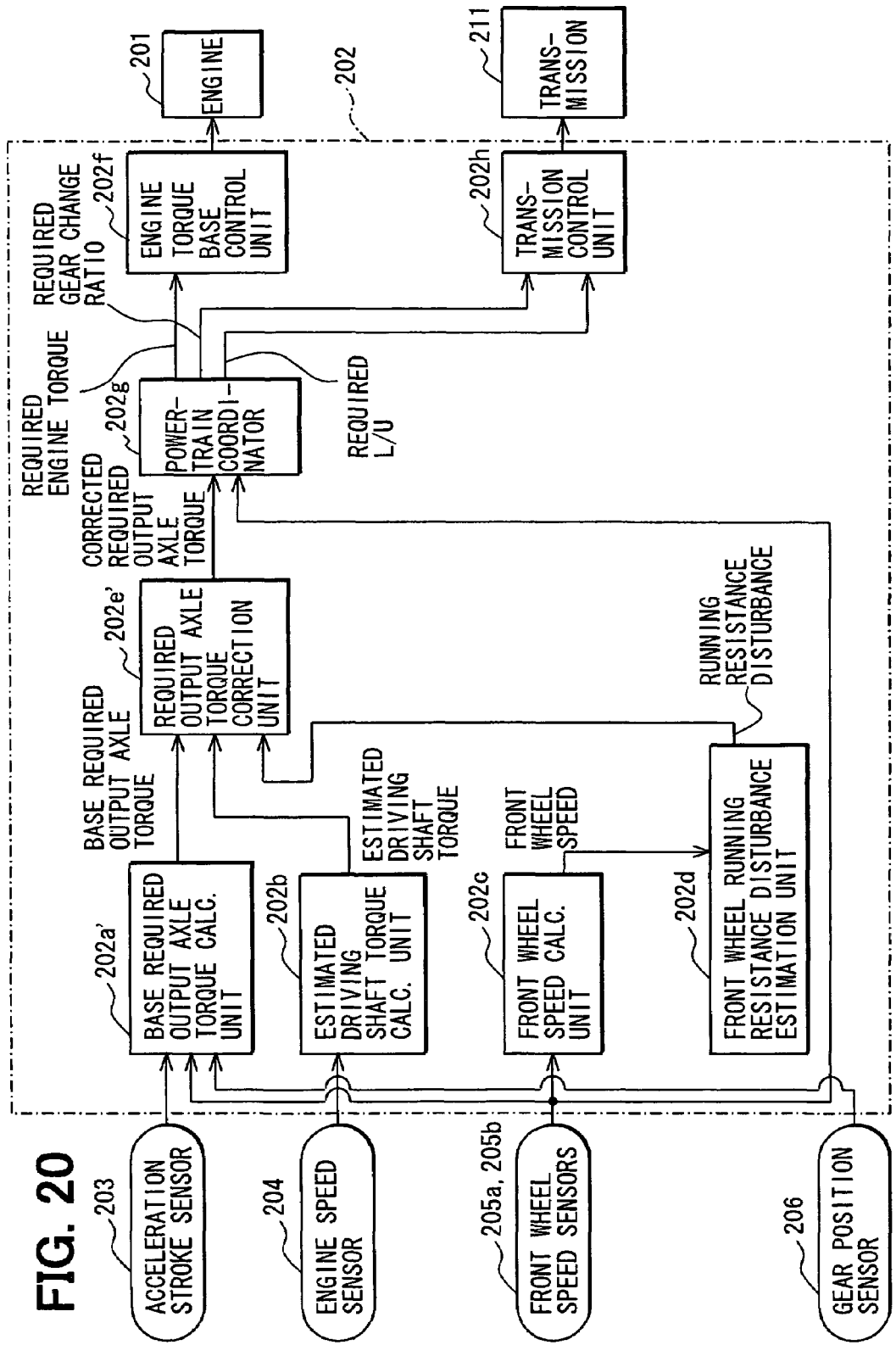
FIG. 20 is a block diagram of an engine electronic control unit in an axle torque based control model.

An axle torque based control mode, for example, can be employed. In this case, as shown in FIG. 20, the base required engine torque calculation unit 202*a* in the engine ECU 202 is replaced with a base required output axle torque calculation unit 202*a*' and also the required engine torque correction unit 202*e* with a required output axle torque correction unit 202*e*'. A correction, which is necessary to correct the base required output axle torque obtained by the base required output axle torque calculation unit 202*a*', is obtained by the required output axle torque correction unit 202*e*'. The correction is multiplied by the speed reducing ratio of the final reduction gear 212 and then is subtracted from the required output axle torque to obtain a corrected required output axle torque. Another parameter determining a driving force can thus be used.

In this case, however, a power-train coordinator 202*g* is disposed before an engine torque base control unit 202*f* as used in each of the above examples (see FIG. 15), and a transmission control unit 202*h* is provided in parallel with the engine torque base control unit 202f. In this structure, the power-train coordinator 202g obtains the required engine torque on the basis of the corrected required output axle torque, and also obtains the required gear change ratio and required L/U on the basis of the corrected required output axle torque and vehicle speed. Then, the engine torque base control unit 202f sets a throttle position, an amount of fuel injection, and ignition timing so as to obtain the required engine torque, and the transmission control unit 202h sets the duty factor for the solenoid in the transmission 211 so as to obtain the required gear change ratio and required L/U.

(2) In the above examples, when other factors necessary for correcting the required driving force occur, for example, when a traction controller and a sideslip prevention controller request to correct the required driving torque, it is possible to take this into consideration and correct the required driving force. In this case, the base required engine torque obtained as a required driving force is corrected according to the requests from the traction controller and sideslip prevention controller, and the resulting value may be regarded as a base required engine torque that has not yet been corrected in consideration of the on-spring vehicle body vibration.

(3) In the above examples, an example has been described in which the state feedback gain Ks is obtained by an optimal regulator design method, but other various methods used in control systems such as, for example, a pole assignment method may be applied to the design of the system.

Embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A vehicle body action information system for a vehicle, comprising:
   a condition detecting part configured to sense vehicle condition information of the vehicle;
   an estimating part configured to estimate a vehicle body action of the vehicle based on the vehicle condition information sensed by the condition detecting part, the estimating part includes capabilities of estimating roll, pitch, yaw and tire angle; and
   an informing device configured to provide, within the vehicle, a picture display representing the vehicle body action estimated by the estimating part.

2. The vehicle body action information system according to claim 1, wherein the picture display representing is a simulation picture of the vehicle body action.

3. The vehicle body action information system according to claim 1, wherein the condition detecting part includes a plurality of sensors.

4. The vehicle body action information system according to claim 1, further comprising;
   a voice informing device configured to audibly output information representing the vehicle body action estimated by the estimating part.

5. The vehicle body action information system according to claim 1, further comprising:
   a transmitting device configured to transmit information representing the vehicle body action estimated by the estimating part to an outside of the vehicle.

6. The vehicle body action information system according to claim 5, further comprising:
   a receiving device provided outside of the vehicle for receiving information transmitted by the transmitting device; and
   an external informing device configured to inform an outside object of the information received by the receiving device.

7. The vehicle body action information system according to claim 1, further comprising:
   a picture selection device configured to select at least one of (i)a number of vehicle views provided by the informing device, (ii) a picture display location, (iii) a 2-dimensional picture display form, and (iv) a 3-dimensional picture display form,
   wherein the informing device is further configured to provide a picture display based on a selection result of the picture selection device.

8. The vehicle body action information system according to claim 1, further comprising:
   an information switching device configured to change the picture display provided by the informing device,
   wherein the informing device provides a picture display based on a change result of the information switching device.

9. The vehicle body action information system according to claim 1, further comprising:
   an automatic operating device for aiding in automatically operating a vehicle by aiding steering of the vehicle to an area selected by a user,
   wherein the informing device is further configured to provide, during operation of the automatic operating device, a picture display representing information on steering the vehicle necessary for the automatically operating the vehicle during operation of the automatic operating device.

10. The vehicle body action information system according to claim 1, further comprising:
    an operation supporting device configured to support an operation for aiding steering to reach an area selected by a user,
    wherein the informing device is further configured to provide, during operation of the operation supporting device, a picture display representing information on steering of the vehicle necessary for automatically operating the vehicle during operation of the automatic operation device.

11. A method, comprising:
    sensing vehicle condition information of a vehicle;
    estimating a vehicle body action of the vehicle based on the sensed vehicle condition information, the estimating step includes capabilities of estimating roll, pitch, yaw and tire angle; and
    providing, within the vehicle, a picture display representing the estimated vehicle body action.

12. A method according to claim 11, wherein the picture display is a simulation picture of the vehicle body action.

13. A method according to claim 11, further comprising:
    selecting at least one of (i) a number of vehicle views for display, (ii) a picture display location, (iii) a 2-dimensional picture display form, and (iii) a 3-dimensional picture display form, wherein the picture display is based on a result of the selecting step.

14. The vehicle body action information system according to claim 1, wherein the vehicle body action is an action of a whole vehicle body.

15. The method of claim 11, further comprising:
    outputting audio information representing the estimated vehicle body action.

16. The method claim 11, further comprising:
    transmitting information representing the estimated vehicle body action to an outside of the vehicle.

17. The method of claim 16, further comprising:
receiving the information outside the vehicle from the transmitting step; and
informing an outside object of the information received by the receiving step.

18. The method of claim 11, further comprising:
changing the picture display based on a change result.

19. The method of claim 11, further comprising:
automatically operating the vehicle by aiding steering of the vehicle to an area selected by a user; and
providing, during the automatically operating step, a picture display representing information on steering of the vehicle necessary for the automatically operating of the vehicle.

20. A vehicle body action information system for a vehicle, comprising:
a condition detecting part configured to sense vehicle condition information of a the vehicle;
an estimating part configured to estimate a vehicle body action of the vehicle based on the vehicle condition information sensed by the condition detecting part; and
an informing device configured to provide, within the vehicle, a picture display representing only the vehicle body action estimated by the estimating part.

21. The vehicle body action information system according to claim 20, wherein the picture display representing is a simulation picture of the vehicle body action.

22. The vehicle body action information system according to claim 20, wherein the condition detecting part includes a plurality of sensors.

23. The vehicle body action information system according to claim 20, further comprising;
a voice informing device configured to audibly output information representing the vehicle body action estimated by the estimating part.

24. The vehicle body action information system according to claim 20, further comprising:
a transmitting device configured to transmit information representing the vehicle body action estimated by the estimating part to an outside of the vehicle.

25. The vehicle body action information system according to claim 24, further comprising:
a receiving device provided outside of the vehicle for receiving information transmitted by the transmitting device; and
an external informing device configured to inform an outside object of the information received by the receiving device.

26. The vehicle body action information system according to claim 20, further comprising:
a picture selection device configured to select at least one of (i) a number of vehicle views provided by the informing device, (ii) a picture display location, (iii) a 2-dimensional picture display form, and (iv) a 3-dimensional picture display form,
wherein the informing device is further configured to provide a picture display based on a selection result of the picture selection device.

27. The vehicle body action information system according to claim 20, further comprising:
an information switching device configured to change the picture display provided by the informing device,
wherein the informing device provides a picture display based on a change result of the information switching device.

28. The vehicle body action information system according to claim 20, further comprising:
an automatic operating device for aiding in automatically operating a vehicle by aiding steering of the vehicle to an area selected by a user,
wherein the informing device is further configured to provide, during operation of the automatic operating device, a picture display representing information on steering the vehicle necessary for the automatically operating the vehicle during operation of the automatic operating device.

29. The vehicle body action information system according to claim 20, further comprising:
an operation supporting device configured to support an operation for aiding steering to reach an area selected by a user,
wherein the informing device is further configured to provide, during operation of the operation supporting device, a picture display representing information on steering of the vehicle necessary for automatically operating the vehicle during operation of the automatic operation device.

30. The vehicle body action information system according to claim 20, wherein the estimating part estimates at least one of roll, pitch, yaw, and tire angle as the vehicle body action.

31. The vehicle body action information system according to claim 20, wherein the vehicle body action is an action of a whole vehicle body.

* * * * *

UNITED STATES PATENT AND TRADEMARK OFFICE
CERTIFICATE OF CORRECTION

PATENT NO.      : 7,630,796 B2                                              Page 1 of 1
APPLICATION NO. : 11/274766
DATED           : December 8, 2009
INVENTOR(S)     : Okada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 850 days.

Signed and Sealed this

Second Day of November, 2010

David J. Kappos
*Director of the United States Patent and Trademark Office*